US007557823B2

(12) United States Patent
Ono et al.

(10) Patent No.: US 7,557,823 B2
(45) Date of Patent: Jul. 7, 2009

(54) IMAGE FORMING APPARATUS

(75) Inventors: Rumiko Ono, Kanagawa (JP); Hiroshi Yoshizawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 11/505,364

(22) Filed: Aug. 17, 2006

(65) Prior Publication Data
US 2007/0046766 A1 Mar. 1, 2007

(30) Foreign Application Priority Data

Aug. 23, 2005 (JP) ............................. 2005-241118
Jul. 13, 2006 (JP) ............................. 2006-192887

(51) Int. Cl.
*B41J 2/47* (2006.01)
(52) U.S. Cl. ..................................... 347/253
(58) Field of Classification Search ................ 347/240, 347/251–254, 236, 237, 246, 247; 358/1.9; 359/216
See application file for complete search history.

(56) References Cited

U.S. PATENT DOCUMENTS 5,532,727 A * 7/1996 Agano et al. ................. 347/253

| 6,628,424 | B2 * | 9/2003 | Sakurai ....................... 358/1.9 |
| 7,161,712 | B2 * | 1/2007 | Maruta et al. ................ 358/1.9 |
| 7,256,918 | B2 * | 8/2007 | Sowa et al. .................. 359/216 |
| 7,336,395 | B2 * | 2/2008 | Tone .......................... 358/1.9 |

FOREIGN PATENT DOCUMENTS

| JP | 08294004 A | * | 11/1996 |
| JP | 2001-66540 | | 3/2001 |
| JP | 2002-162585 | | 6/2002 |
| JP | 2002-182448 | | 6/2002 |
| JP | 2003-295095 | | 10/2003 |
| JP | 2003-329959 | | 11/2003 |
| JP | 2004-54116 | | 2/2004 |
| JP | 3652238 | | 3/2005 |
| JP | 2006058557 A | * | 3/2006 |

* cited by examiner

*Primary Examiner*—Hai C Pham
(74) *Attorney, Agent, or Firm*—Oblon, Spivak, McClelland, Maier & Neustadt, P.C.

(57) ABSTRACT

An image forming apparatus including a light source unit configured to emit a light beam, an optical deflector configured to generate a scanning light beam from the light beam of the light source unit, an optical writer having an optical system configured to guide the scanning light beam from the optical deflector onto a surface to be scanned of image carriers and forming an image thereon: and a memory unit to store a plurality of shading correction data that is configured to correct a light shading caused by a light loss between the light beam and the scanning light beam due to accumulation of dirt on the optical deflector.

20 Claims, 23 Drawing Sheets

IMAGE FORMING APPARATUS

BACKGROUND OF THE INVENTION

1. Field of the Invention

The present invention relates to an image forming apparatus such as a copier, a printer, a facsimile device and a plotter which comprise an optical writer for writing a latent image by irradiating a laser beam onto the surface to be scanned of an image carrier such as a photosensitive drum, and in which the latent image formed on the image carrier is developed using a developer and then successively transferred to a transfer material and fixed by fixing means.

2. Description of the Related Art

Conventional optical writers of this type are apt to be affected by dust and, for this reason, the housing thereof in which optical components such as a polygon mirror are housed has high airtightness, the assembly thereof being performed in a clean room.

Japanese Laid-Open Patent Application No. 2001-066540 discloses an optical writer of a configuration for switching the direction of rotation of a mirror between when a latent image is written on an image carrier and when it is not. In this optical writer, negative pressure is produced on the section of the reflective surface of the mirror toward the rotating direction side from the center thereof and, even if dust and dirt attaches to this section, because the mirror can be rotated in the reverse direction to when a latent image is being written, the dust and dirt attached to the reflective surface to that point can be separated from the reflective surface by exposure to a fast flow of air, whereupon sticking of dirt and dust to the mirror can be prevented without need for a structure in which the mirror is airtight-sealed to be adopted.

However, because of the floating toner, paper dust and dust and so on present in the interior of, for example, a laser printer in which an optical writer is commonly mounted, the penetration of at least a minute amount of dust and dirt into the housing is inevitable. As described in detail below, dust and dirt that penetrates the housing attaches to each mirror surface of the polygon mirror from which the optical writer is configured, and the attachment of this dust has a significant effect from the viewpoint of reducing the reflectance thereof. Especially, since mirror surface reflectance differs between the rotation direction end and the opposing direction end thereto of a polygon mirror, a so-called shading correction in which the optical intensity of the laser is changed in accordance with the position in the scan direction is performed, but there is a problem in that, because the shading changes occur frequently, the correction value thereof must be changed just as frequently which, for the operator or serviceman of this optical writer, is a troublesome and inefficient operation.

Technologies relating to the present invention are also disclosed in, for example:

Japanese Laid-Open Patent Application No. 2002-162585
Japanese Laid-Open Patent Application No. 2003-295095
Japanese Laid-Open Patent Application No. 2003-329959
Japanese Laid-Open Patent Application No. 2004-054116
Japanese Patent No. 3652238

SUMMARY OF THE INVENTION

With the foregoing in view, it is an object of the present invention to provide an image forming apparatus in which, even if dust attaches to the polygon mirror surface over time and a reduction in reflectance occurs, image deterioration can be prevented.

In accordance with the present invention, there is provided an image forming apparatus, comprising: light source units; an optical deflector for deflectively scanning light beams from the light source units; an optical writer comprising an optical system for guiding the light from the optical deflector onto the surface to be scanned of image carriers and forming an image thereon; and memory device for storing a plurality of shading correction data in advance.

BRIEF DESCRIPTION OF THE DRAWINGS

The above and other objects, features and advances of the present invention will become more apparent from the following detailed description based on the accompanying drawings in which.

DESCRIPTION OF THE PREFERRED EMBODIMENTS

Prior to describing the present invention, the prior art and related problems thereof will be described.

Figure 1:
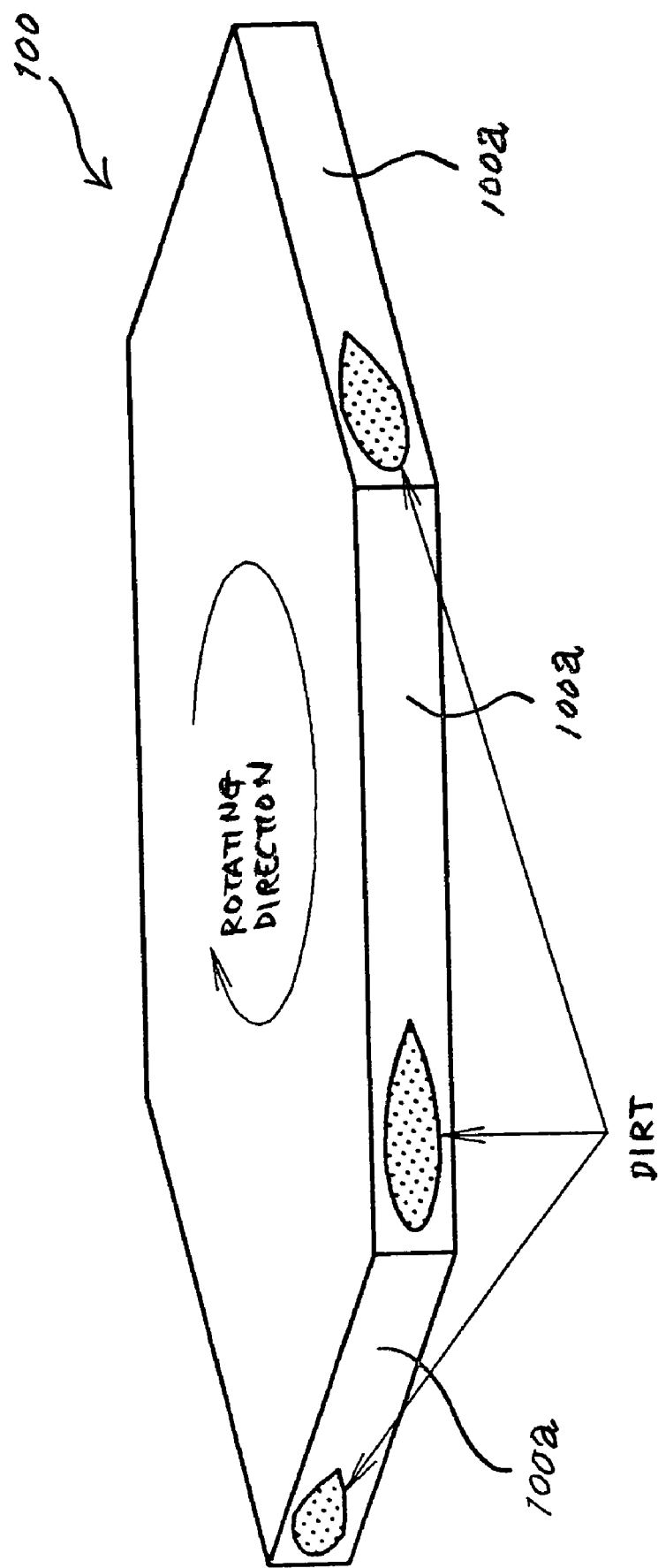
FIG. 1 is a schematic perspective view of a polygon mirror when rotated at high speed in the clockwise direction.

As stated earlier, because of the floating toner, paper dust and dust in the air within the interior of, for example, a laser printer in which an optical writer is mounted, the penetration of at least a minute amount of dust into the housing is inevitable. This being the case, as shown in FIG. 1, when a polygon mirror 100 is rotated at high speed in the clockwise direction (in the drawing), a relative airflow is generated on each mirror surface 100a and, because the rotation direction ends of the mirror surfaces 100a are in shadow of the edge portion of the polygon mirror 100 a negative pressure onto which dust is more liable to be drawn is formed on these sections. On the other hand, a positive pressure from which the dust is more liable to be blown off is formed in the opposing direction ends to the rotation direction ends of each mirror surface 100a.

For this reason, as shown in the drawing, in the rotation direction end of each mirror surface 100a, a large amount of dust attaches to the center part in the lateral direction of the mirror surface, and while not shown in the drawing, at the opposing end to the rotation direction end a small amount of dust attaches to the two ends thereof in the lateral direction. Moreover, because a laser beam falling incident on the polygon mirror 100 is condensed to the approximate center in the lateral direction of the polygon mirror and, without being condensed, extends over a wide range in the longitudinal direction of the polygon mirror, the attachment of this dust has a significant effect in terms of reducing the reflectance thereof. Incidentally, mirror surface 100a reflectance differs between the rotation direction end and the opposing direction end in the polygon mirror 100 and a so-called shading correction in which the optical intensity of the laser changes in accordance with scan direction position is performed, but there is a problem in that, because the shading changes occur frequently, the correction value thereof must be changed just as frequently. For the operator or serviceman of this optical writer this is a troublesome and inefficient operation.

Figure 2:
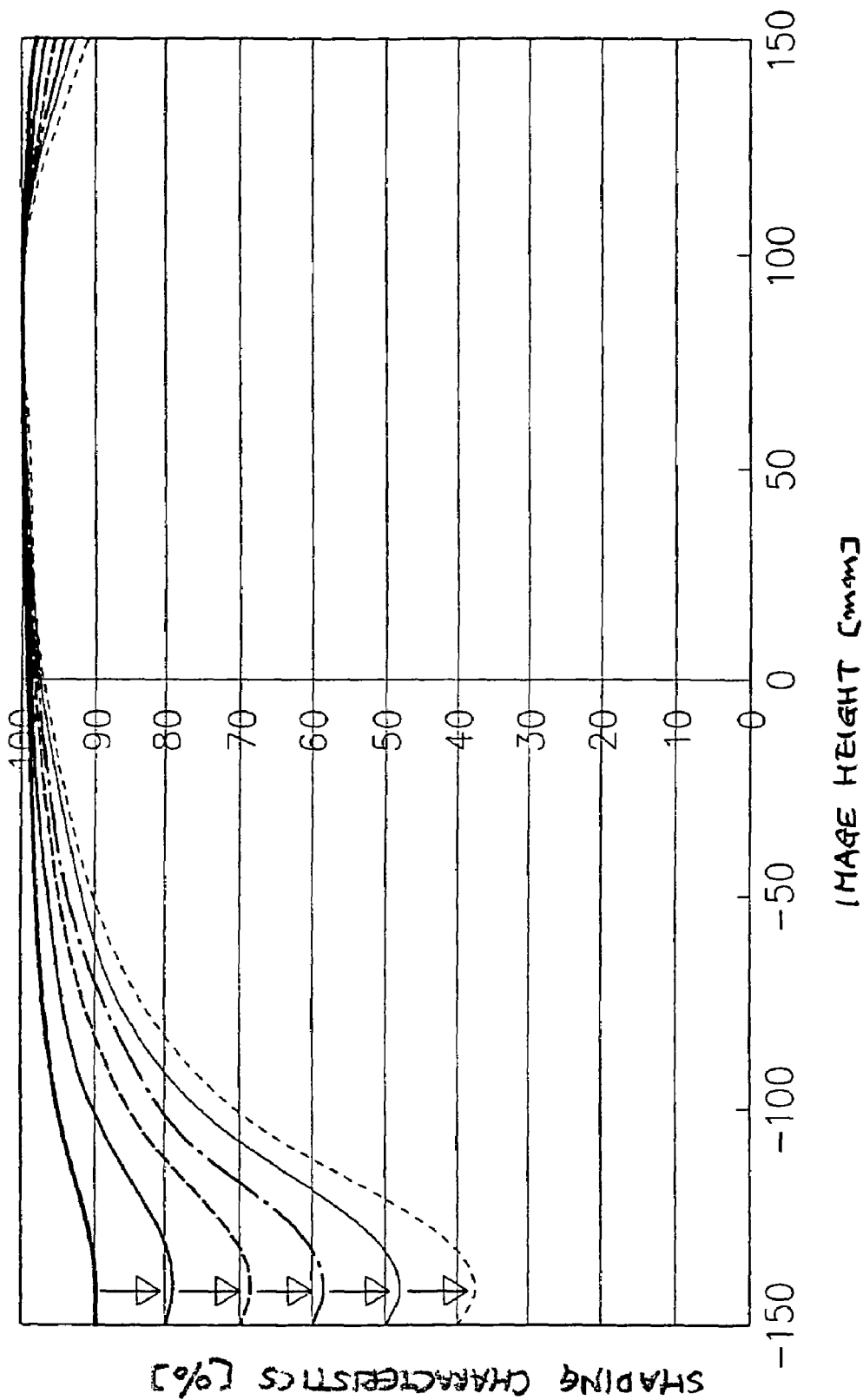
FIG. 2 is a diagram showing deterioration of shading characteristics over time.

FIG. 2 shows deterioration of shading characteristics over time. As shown in this drawing, there is a marked deterioration in shading characteristics at negative image height (dirt attached side). Image density irregularity defects are caused by shading deterioration.

The present invention, which resolves the problems of the prior art described above, will be hereinafter described in detail with reference to the drawings.

First, a first embodiment of the present invention will be described with reference to FIGS. 3 and 4.

Figure 3:
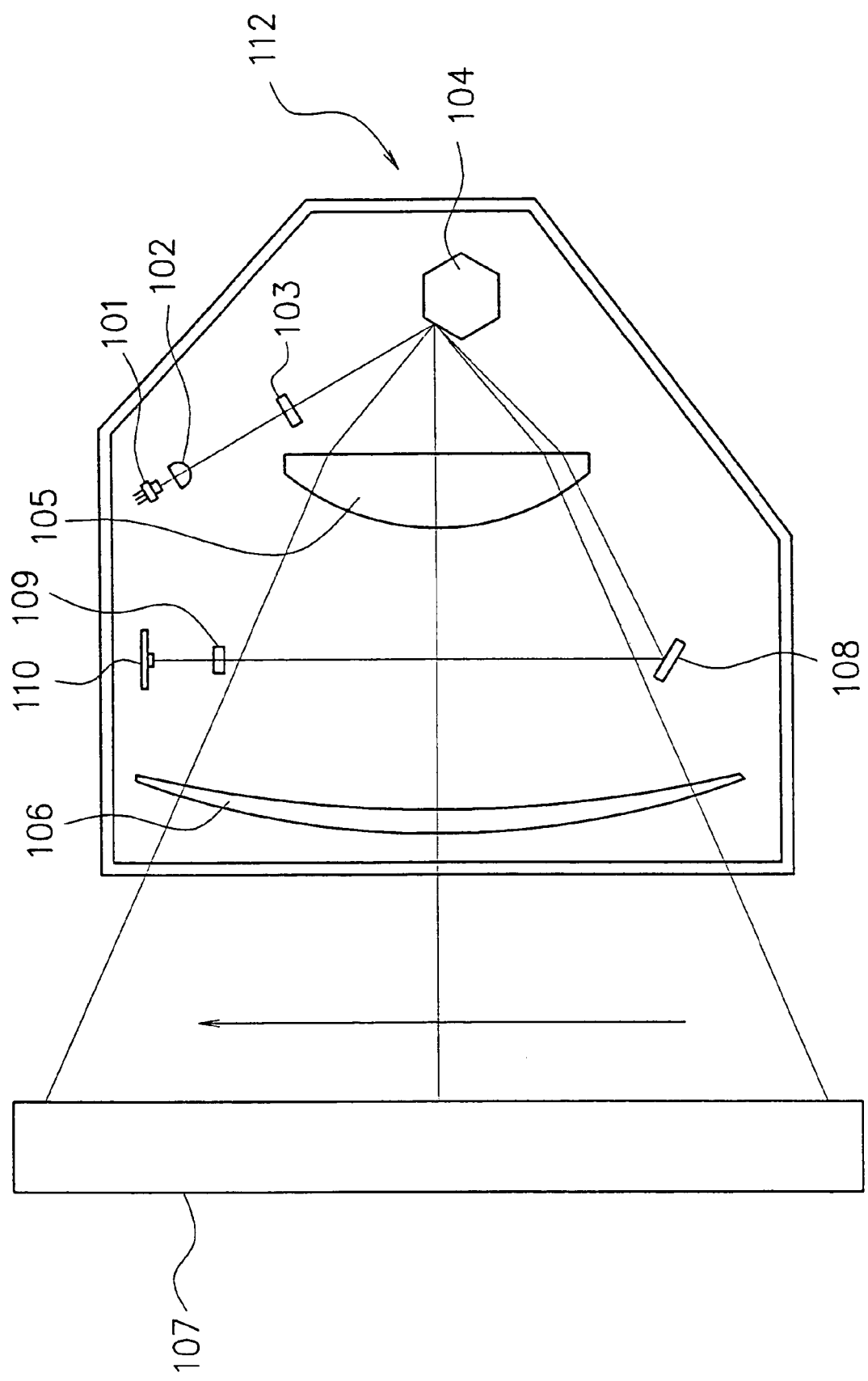
FIG. 3 is a diagram showing the configuration of an optical writer of a first embodiment of the present invention.

FIG. 3 shows the configuration of an optical writer 112 of this embodiment. As shown in the drawing, a light beam emitted from a light source 101 is formed as a substantially parallel light by a collimator lens 102 and condensed in the subscan direction by a cylindrical lens 103 before being deflectively scanned by a polygon mirror 104. Following this, by way of an imaging lens system comprising an fθ lens 105 and long lens for image plane curvature correction 106, a latent image is formed on an image carrier 107.

Some of the light beam deflectively scanned by the polygon mirror 104 is reflected by a synchronous detector mirror 108 and condensed by a synchronized detector lens 109 so as to fall incident on an optical sensor 110 which generates a synchronous detection signal. The synchronous detection signal is generated when a light beam falls incident on the optical sensor 110, and the writing of an image is based on this signal.

Figure 4:
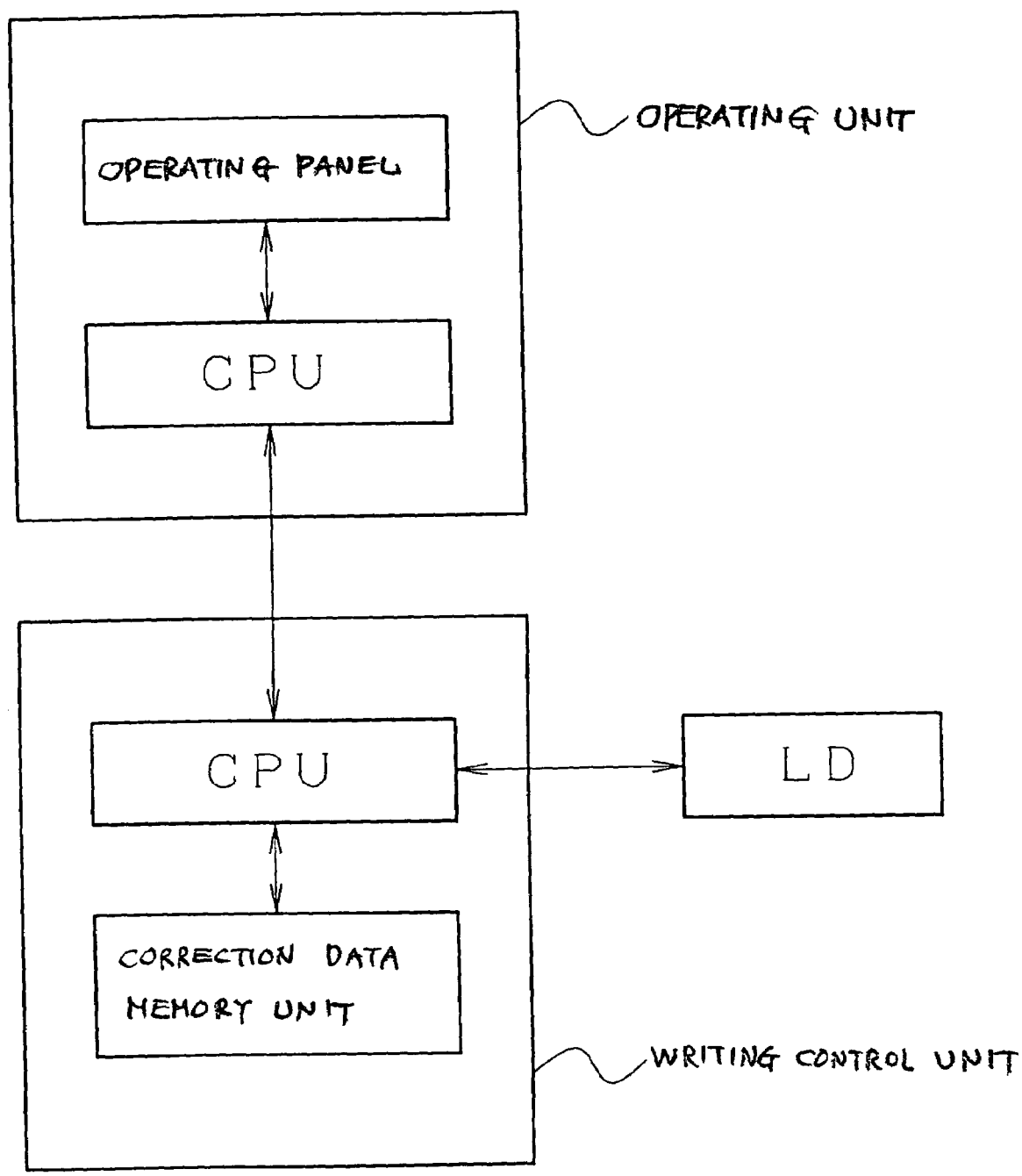
FIG. 4 is a block diagram showing the configuration of an LD drive control system.
Figure 5:
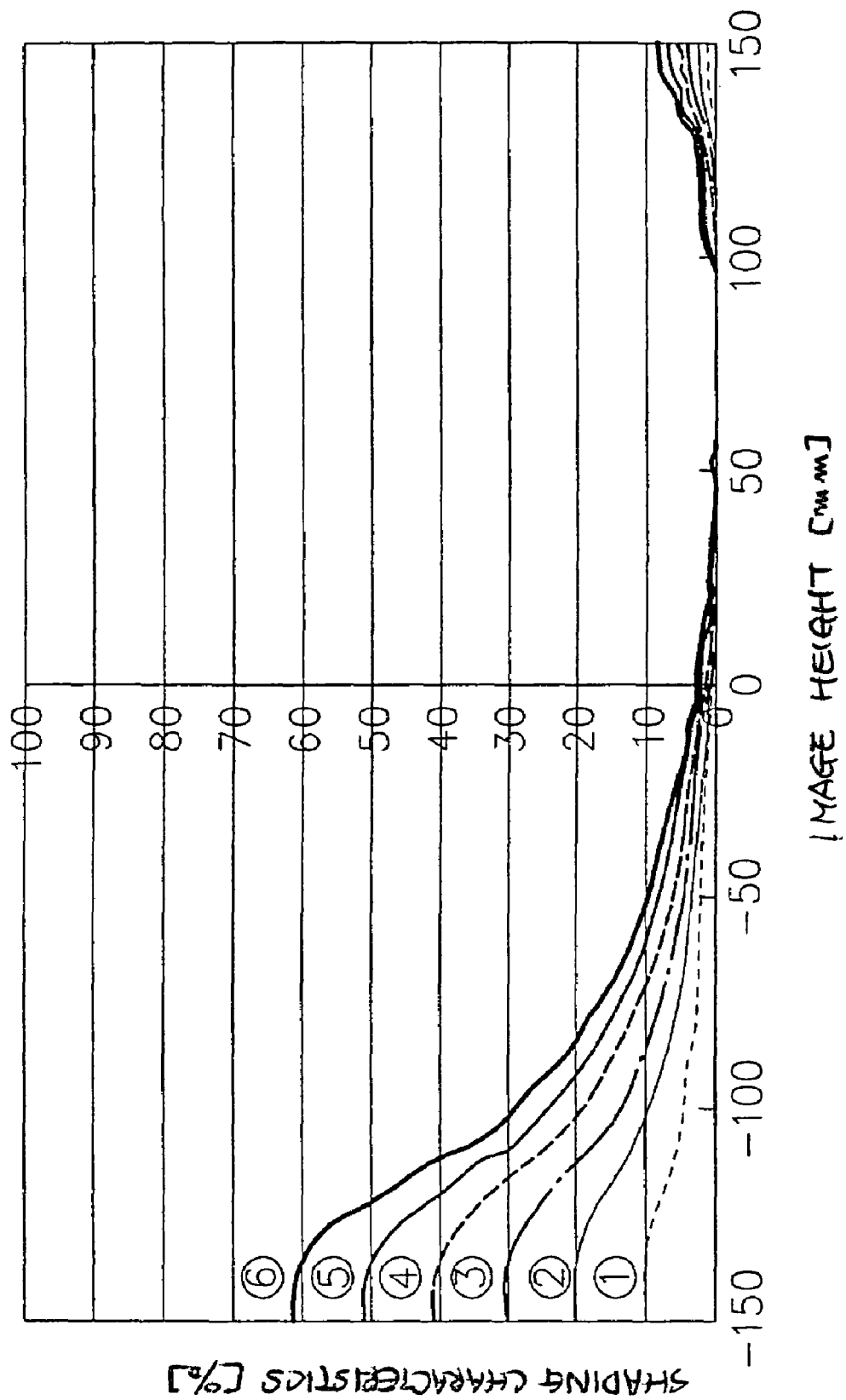
FIG. 5 is a diagram showing an example of a plurality of shading correction data.

FIG. 4 shows the configuration of an LD drive control system. As shown in the drawing, a write control unit comprises a correction data memory unit in which the plurality of shading correction data shown in FIG. 5 is stored in advance. The user or serviceman, by way of an operating panel of an operating unit, is able to select the desired shading correction data from among the plurality of shading correction data stored in the correction data memory unit.

By virtue of this, even if dirt attaches to the polygon mirror over time and the shading characteristics for image data writing deteriorate over time resulting in the generation of image defects such as density irregularity, because the user or serviceman is able to select suitable shading correction data, such image defects can be avoided.

A second embodiment of the present invention will be hereinafter described.

First, a schematic configuration of a common image forming apparatus will be described.

An image forming apparatus shown in FIG. 6 constitutes a full-color image forming apparatus in which, serving as a plurality of image carriers, a plurality of drum-like photoconductive photosensitive members (hereinafter photosensitive drums) 1, 2, 3, 4 are juxtaposed, these four photosensitive drums 1, 2, 3, 4 forming images correspondent to, for example, in order from left in the drawing, the colors black (Bk), cyan (C), magenta (M) and yellow (Y) respectively (the color order is not restricted thereto and may be set as desired).

Charging units (charging roller, charging brush, charging charger and so on) 6, 7, 8, 9, an exposure unit for light beams L1, L2, L3, L4 from an optical writer 5, developing units (developing devices for each color Bk, C, M and Y) 10, 11, 12, 13, transfer carry apparatus 22 comprising transfer carry belt 22a and transfer means (transfer roller, transfer brush) 14, 15, 16, 17, and cleaning units (cleaning blade, cleaning brush and so on) 18, 19, 20 21 and so on are arranged around these four photosensitive drums 1, 2, 3, 4 for implementing image forming based on an electrophotography process, and image forming of each color is able to be performed on each of these photosensitive drums 1, 2, 3, 4.

Figure 6:
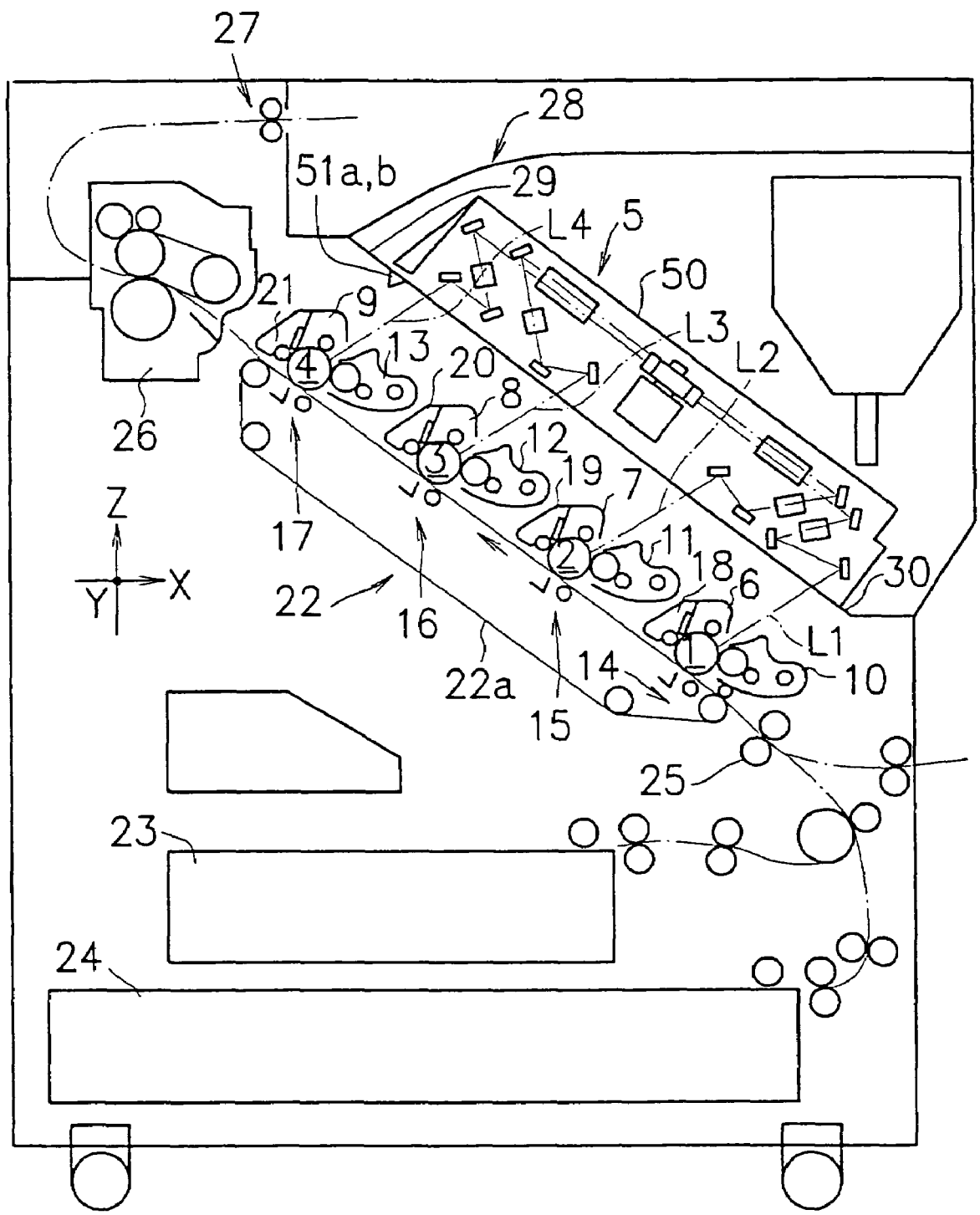
FIG. 6 is a diagram showing the schematic configuration of an image forming apparatus of a second embodiment of the present invention.

In a more detailed description of the configuration of FIG. 6, taking the Z-direction in the drawing as the vertical upper direction and the X- and Y-directions as the horizontal direction, the juxtaposed direction of the four photosensitive drums 1, 2, 3 4 is inclined to the horizontal plane, the transfer carry apparatus 22 is arranged in an incline to the horizontal plane in such a way as to be substantially parallel to the juxtaposed direction of the four photosensitive drums 1, 2, 3, 4, and the transfer material being fed from the lower side of this inclined direction to the upper side by the transfer carry belt 22a and carried successively to the transfer unit of the four photosensitive drums 1, 2, 3, 4, a fixing device 26 being arranged in the upper side of the incline direction at the downstream side in the carry direction of the transfer material. In addition, the optical writer 5 is arranged diagonally above the image production unit in which the four photosensitive drums 1, 2, 3, 4 are arranged, and a housing 50 of the optical writer 5 is arranged in an incline to the horizontal plane (X direction in the drawing) so as to be substantially parallel to the juxtaposed direction of the four photosensitive drums 1, 2, 3, 4, and is fixed to inclined frames 29, 30 of the image forming apparatus main body.

Figure 7:
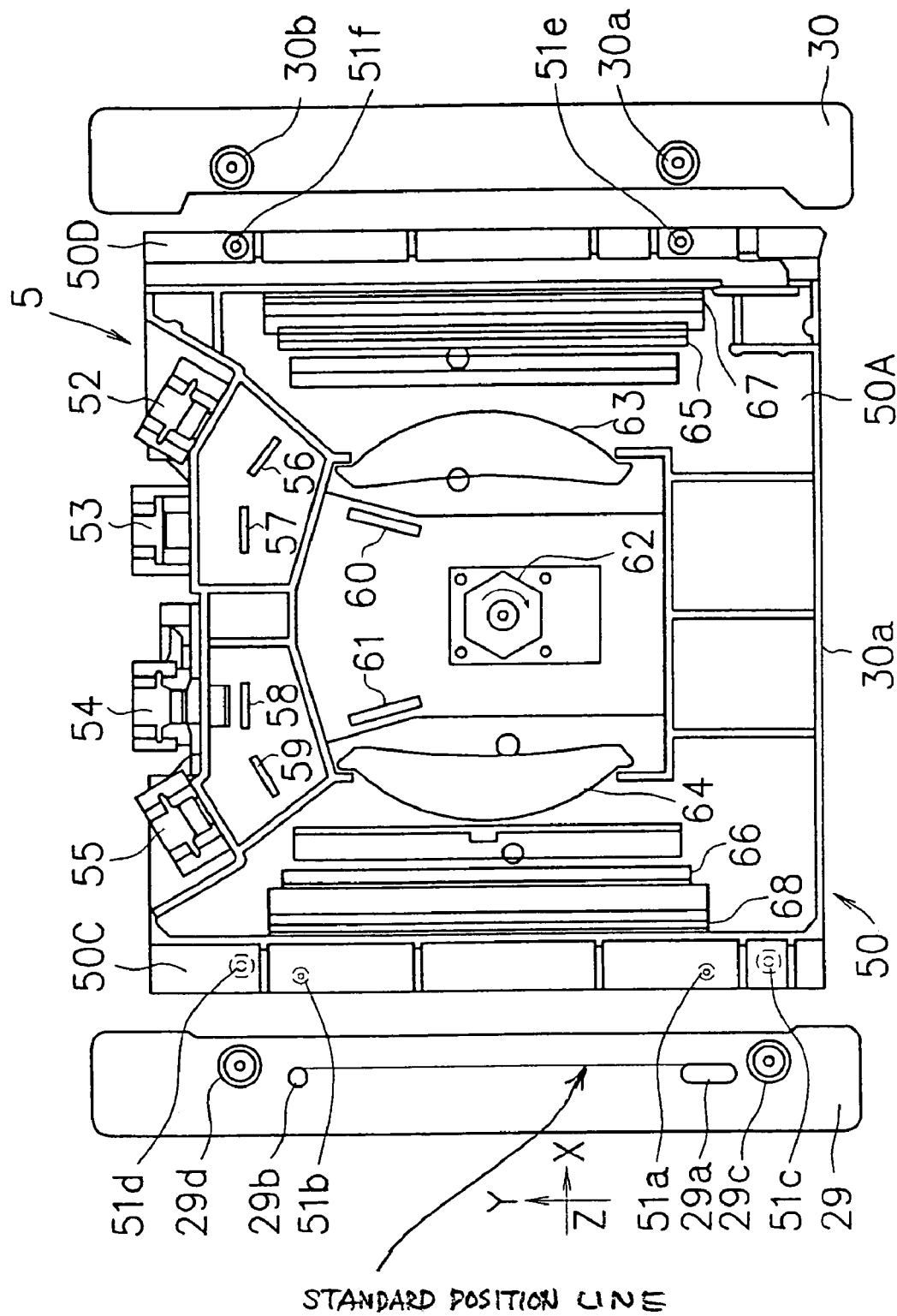
FIG. 7 is a diagram showing the configuration of an optical writer of the second embodiment.

As shown in FIG. 7, the optical writer 5 comprises four light source units 52, 53, 54, 55, an optical deflector 62 for splitting the light beams L1 L2, L3, L4 from these light source units in two symmetric directions and deflectively scanning the light beams, an optical system (consisting of optical members such as imaging lens 63, 64, 69, 70, 71 and 72, optical path folding mirrors 65, 66, 67, 68, 73, 74, 75, 76, 77, 78, 79, 80) arranged in the two directions symmetrically about the optical deflector 62 for guiding the plurality of light beams L1, L2, L3, L4 deflectively scanned by the optical deflector 62 onto the surface to be scanned of correspondent photosensitive drums 1, 2, 3, 4, and forming images thereon, these constituent members being housed in the single housing 50.

Figure 8:
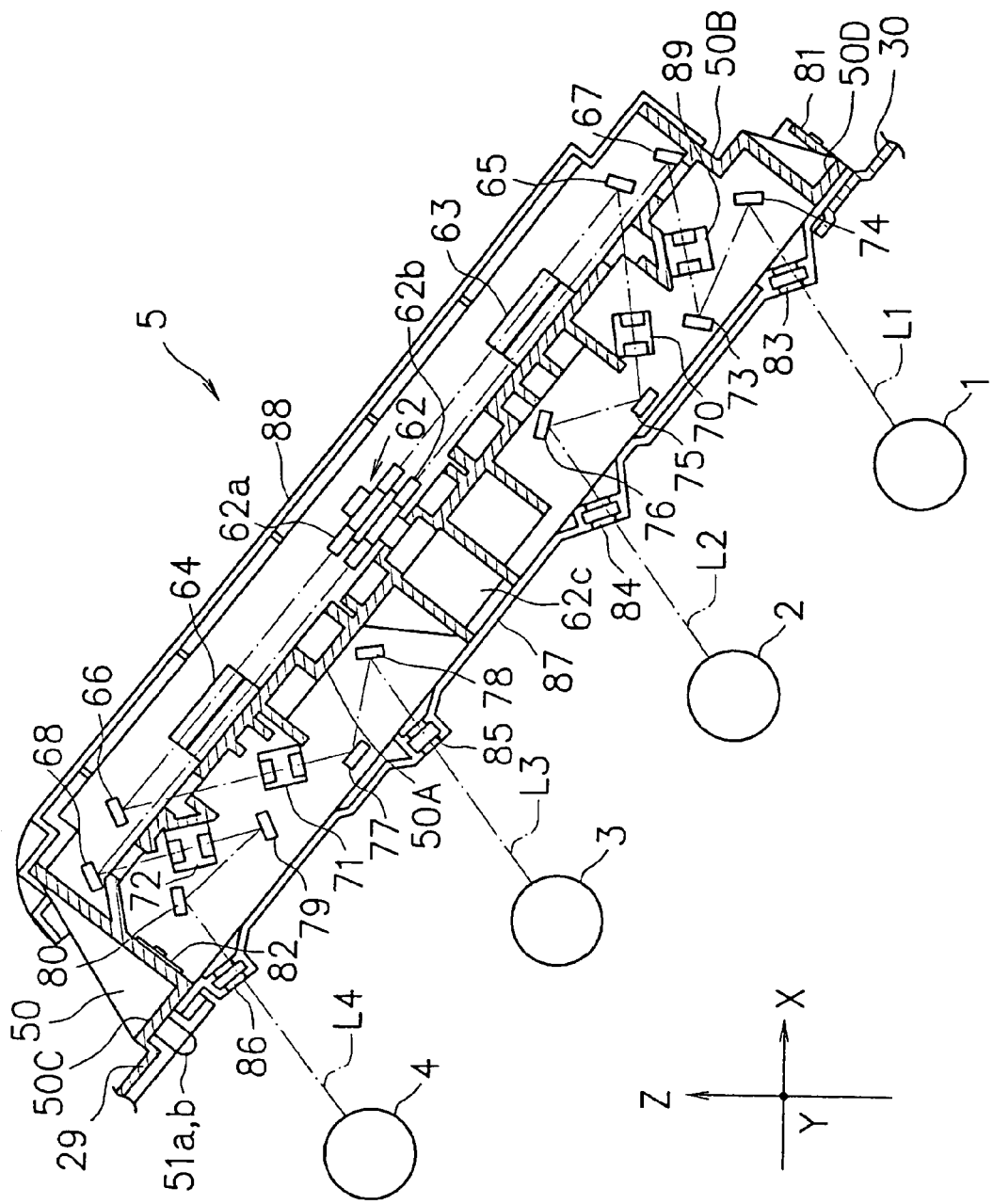
FIG. 8 is a cross-sectional view showing the configuration of a housing for the optical writer.

More specifically, as shown also in the cross-sectional view of FIG. 8, the housing 50 comprises a base plate 50A on which the optical deflector 62 and optical system are arranged, and a frame-shaped sidewall 50B surrounding the perimeter of the base plate 50A, the housing 50 being partitioned into top and bottom by the provision of the base plate 50A in the approximate center of the sidewall 50B, the four light source units 52, 53, 54, 55 are arranged in the sidewall 50B of the housing 50 and are juxtaposed in substantially the same direction as the direction of juxtaposition of the photosensitive members, the optical deflector 62 is arranged in the approximate center of the base plate 50A of the housing 50, and the optical members (such as imaging lens 63, 64, 69, 70, 71, 72, optical path folding mirrors 65, 66, 67, 68, 73, 74, 75, 76, 77, 78, 79, 80 and so on) from which the optical system is configured are separately arranged in the two surfaces (the upper surface side and the lower surface side) of the base plate 50A. In addition, covers 87, 88 are provided on an upper part and lower part of the housing 50, openings through which the light beams pass are provided in the cover 87 of the lower part side, and anti-dust glass 83, 84, 85, 86 is affixed to these openings.

In the optical writer 5 image data that has been input and color-separated from an original copy reader (scanner) or image data outputter (receiver unit of a personal computer, word processor, facsimile or the like) not shown in the drawing is converted to a light source drive signal and, in accordance therewith, light sources (semiconductor lasers (LD)) of the light source units 52, 53, 54, 55 are driven to emit light beams. The light beams emitted from the light source units 52, 53, 54, 55 pass through optical face tangle error-correcting cylindrical lens 56, 57, 58, 59 and, directly or by way of mirrors 60, 61, arrive at the optical deflector 62 where they are deflectively scanned in the two symmetric directions by 2-stage polygon mirrors 62a, 62b being rotated at high speed by a polygon motor 62c or the like.

The light beams, of which two each are deflectively scanned in the two directions by the polygon mirrors 62a, 62b of the optical deflector 62, pass through the imaging lens 63, 64 respectively which comprise, for example, an fθ lens or the like of an upper/lower 2-layer configuration, are folded by first folding mirrors 65, 66, 67, 68 so as to pass through an opening part of a base plate 51, and then pass through second imaging lens 69, 70, 71, 72 which comprise, for example, long torodial lens whereupon, by way of a second folding mirrors 73, 75, 77, 79, third folding mirrors 74, 76, 78, 80 and anti-dust glass 83, 84, 85, 86, are irradiated on the surface to be scanned of the photosensitive drums 1, 2, 3 and 4 of each color and written as static latent images.

Next, as shown in FIG. 6, a transfer carry belt 22a arranged below the four juxtaposed photosensitive drums 1, 2, 3, 4 spans between a drive roller and a plurality of driven rollers and is carried in the direction shown by the arrow in the drawing by the drive roller. In addition, a plurality of paper feed units 23, 24 in which a transfer material such as recording paper is housed is arranged in the lower part of the main body of the image forming apparatus, and the transfer material housed in the paper feed units 23, 24 is fed to the transfer carry belt 22a by way of a paper feed roller, carry roller and resist roller 25 and is supported on and carried by the transfer carry belt 22a.

The latent images formed on the photosensitive drums 1, 2, 3, 4 by the optical writer 5 are developed and image-converted using the toner of each of the colors of Bk, C, M, Y of the developer units 10, 11, 12, 13, and these image-converted toner images of each of the colors of Bk, C, M, Y are superposed and transferred in succession onto the transfer material supported on the transfer carry belt 22a by transfer means 14, 15, 16, 17 of the transfer carry device 22. The transfer material onto which the images of four colors have been transferred is carried to a fixing device 26 and, following the fixing of the images by the fixing device 26, is carried out onto a paper discharge tray 28 by a paper discharge roller 27.

Figure 9:
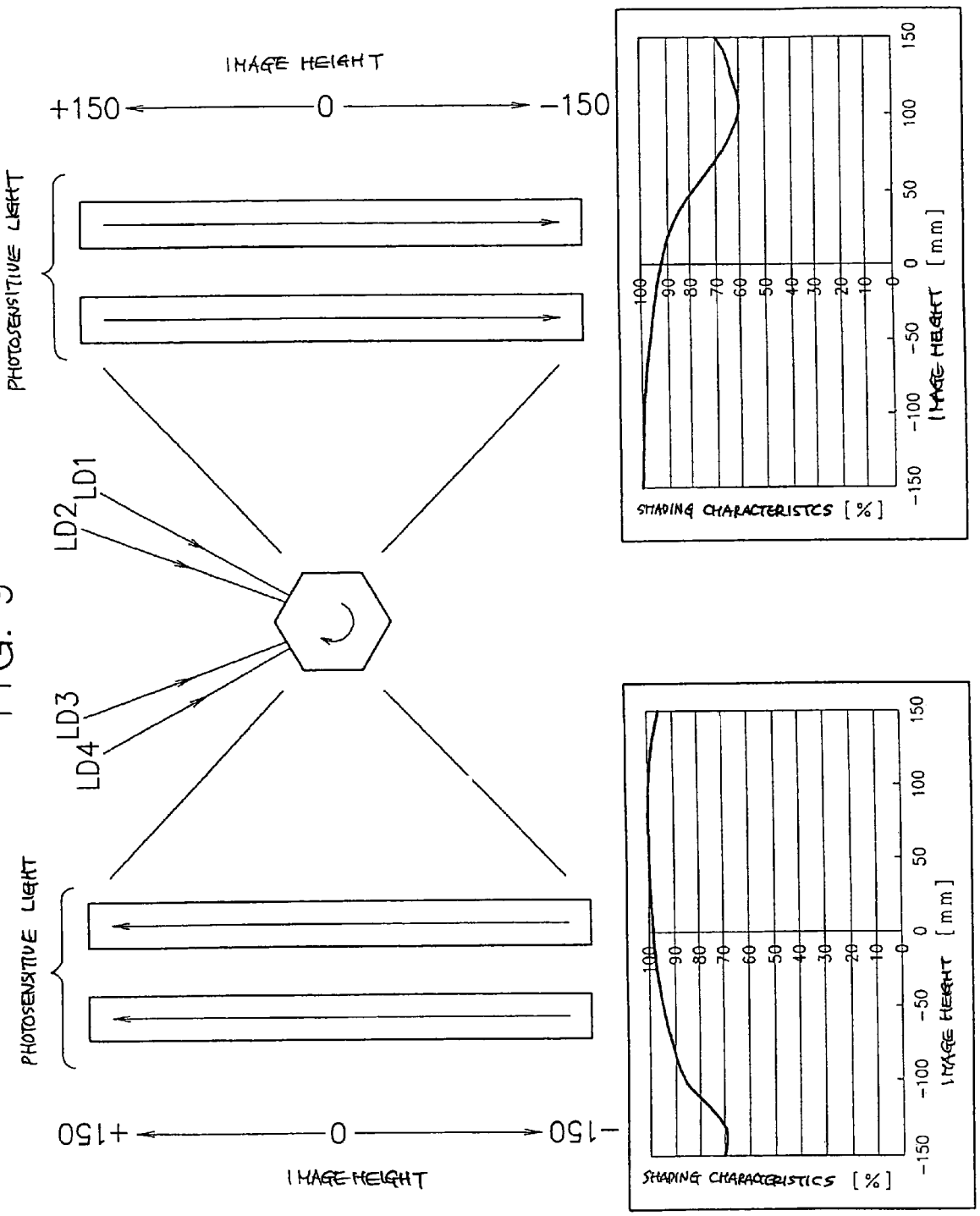
FIG. 9 is a diagram showing the shading characteristics in two opposing scan directions.

FIG. 9 shows the shading characteristics in two opposing scan directions when dirt attaches to the polygon mirror over time. In an opposing scan method, because the direction in which the photosensitive member is scanned is the reverse direction, the deterioration in shading characteristics caused by the attachment of dirt is generated in the reverse position of image height. Accordingly, the shading characteristics of all colors cannot be corrected by any one shading correction pattern.

Figure 10:
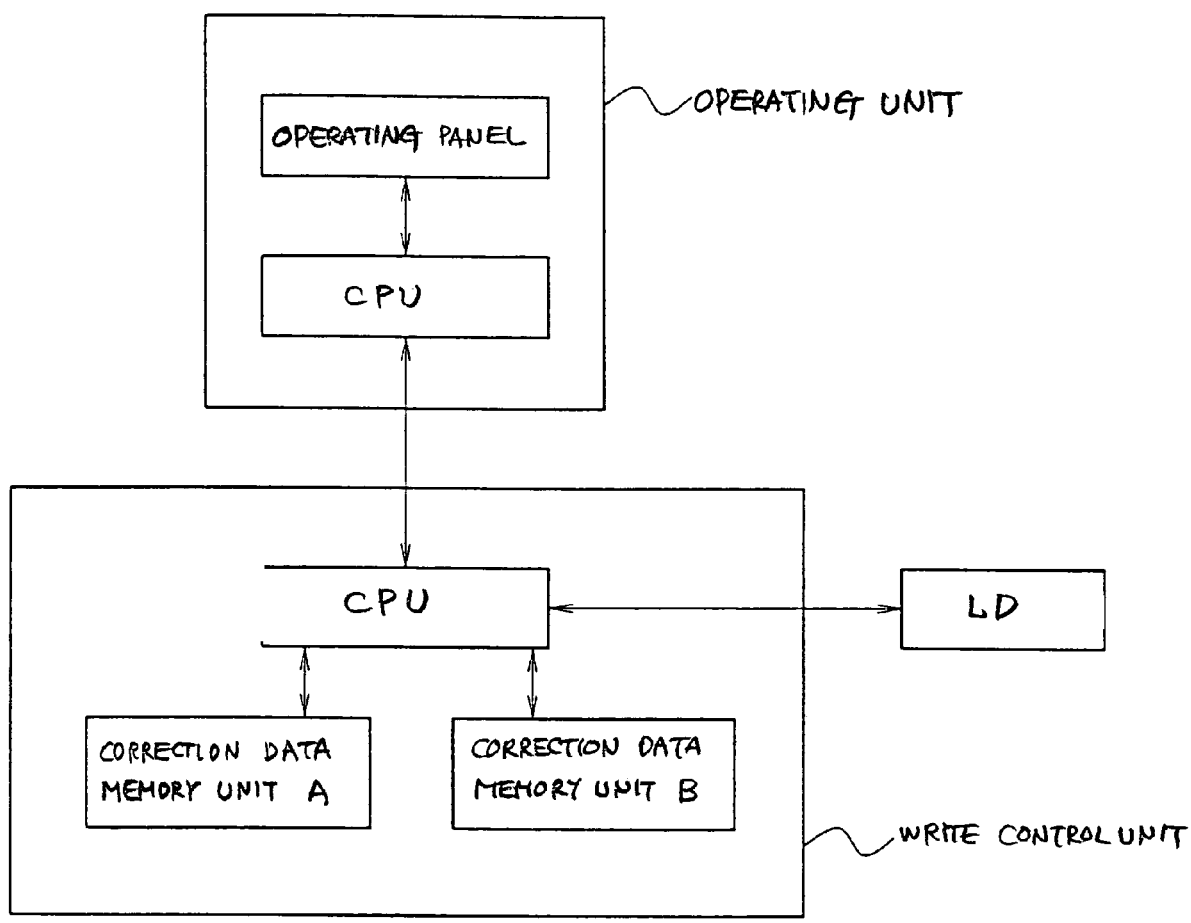
FIG. 10 is a block diagram showing the configuration of a system for storing shading correction data of a different type.

As shown in the block diagram of FIG. 10, this embodiment comprises a correction data memory unit A and correction data memory unit B for storing shading correction data of different types. The shading correction data of different types shown in FIG. 11 is stored in the correction data memory unit A and correction data memory unit B.

Figure 11:
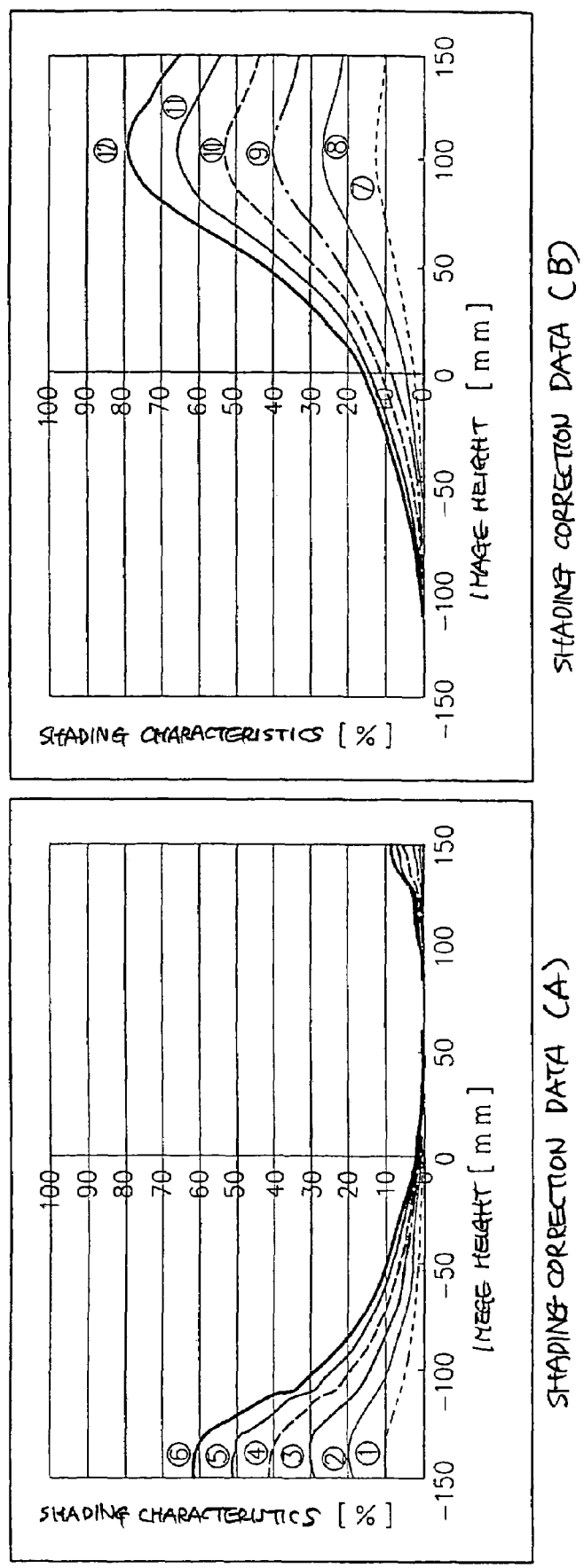
FIG. 11 is a diagram showing an example of shading correction data of a different type.

For the LD3 and LD4 of FIG. 9, selection is made as appropriate from the shading correction data (A) shown in this drawing, while for LD1 and LD2 selection is made as appropriate from the shading correction data (B) shown in FIG. 11. As a result, even if dirt attaches to the polygon mirror over time and the shading characteristics deteriorate, shading correction can be effectively performed on opposing beams.

By virtue of this, even if dirt attaches to the polygon mirror over time and the shading characteristics of the written image data deteriorate resulting in image defects such as image density irregularity, because the user or serviceman is able to select shading correction data suitable for an opposing beam, shading correction can be effectively performed.

Figure 12:
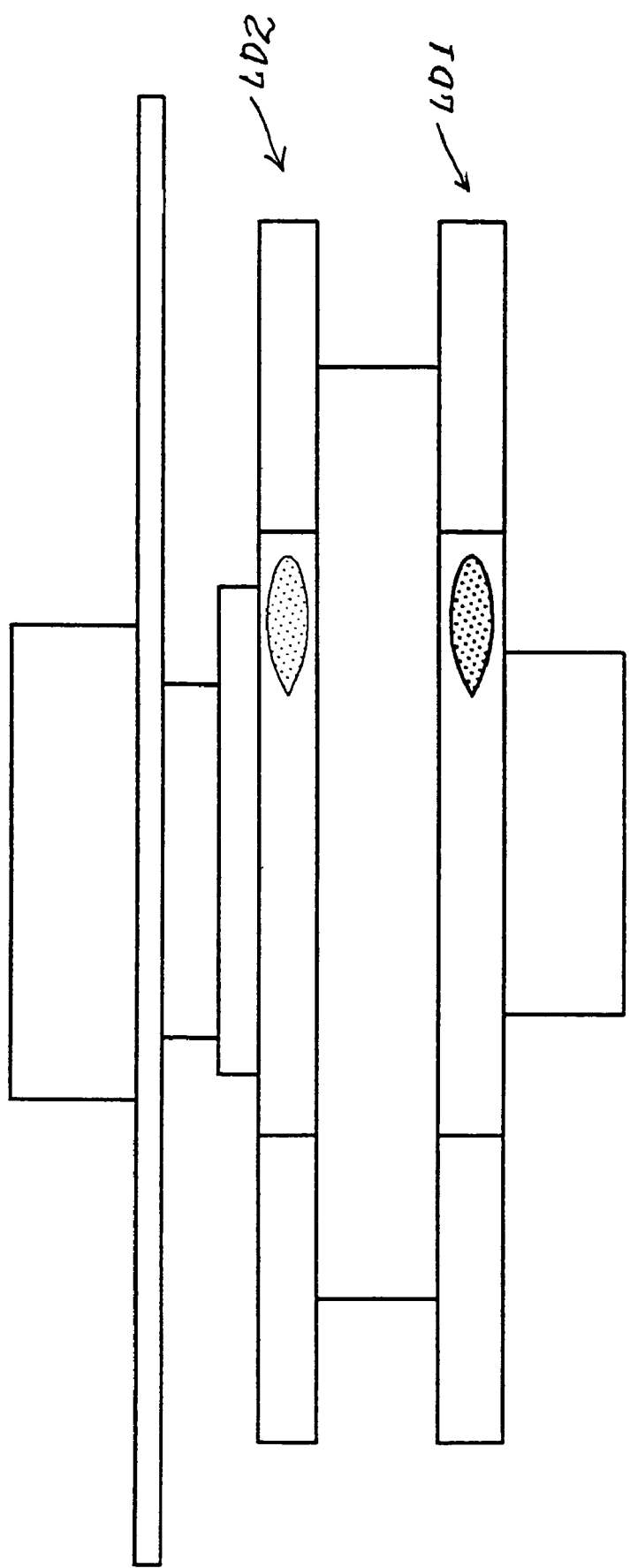
FIG. 12 is a diagram showing an example of a 2-stage mirror configuration.

As shown in FIG. 11, it is clear that the amount of attached dirt generated over time in a 2-stage mirror-type polygon scanner such as is shown in FIG. 12 is larger in an upper-stage mirror and minimal in the lower-stage mirror. For this reason, exactly identical correction data cannot be used in each opposing scan direction. (For example, if shading correction data is determined to ensure that the image density irregularity of the color described by LD2 (correspondent to the upper-stage mirror) is inconspicuous and this same correction data is applied to LD1 (correspondent to lower-stage mirror), because the deterioration of the shading characteristics of LD1 is not as advanced as that of LD2, excessive correction sometimes results).

Because this embodiment enables correction data to be selected for each individual color, the optimum shading correction data can be selected for each color and shading correction can be more effectively performed.

According to the above embodiment, an image forming apparatus can be provided in which, because it comprises memory means for storing a plurality of shading correction data in advance, with selection means to enable desired correction data to be selected from among the plurality of shading correction data stored in advance being provided, even if dirt attaches to the polygon mirror surface and the shading characteristics deteriorate over time resulting in the generation of image defects such as image density irregularity, the user or the serviceman is able to easily select the optimum shading correction data and, as a result, shading correction is effectively performed and image defects can be alleviated.

In addition, an image forming apparatus can be provided in which, because it comprises a plurality of light source units, an optical deflector for splitting the plurality of light beams from the plurality of light source units in two symmetric directions and deflectively scanning the light beams, an optical writer arranged in the two directions symmetrically about the optical deflector and comprising an optical system that guides a plurality of light beams deflectively scanned by the optical deflector onto a surface to be scanned correspondent thereto and forms images thereon, and memory means for storing the plurality of shading correction data in advance, with selection means to enable desired selection data to be selected from the plurality of shading correction data stored in advance being provided and correction data of different types and correction data for each color being able to be selected from among the plurality of shading correction data for each of the two directions in which the light beams are split, even if dirt attaches to the polygon mirror surface and the shading characteristics deteriorate over time resulting in the generation of image defects such as image density irregularity and, furthermore, even if the trend in deterioration of the shading characteristics attributable to the adoption of an opposing scan method and a 2-stage mirror is difference for each individual color, shading correction is effectively performed and image defects can be alleviated.

In this embodiment, the selection of correction data is implemented as a result of instructions input via an operating panel by the user or serviceman of the device.

Incidentally, because the accumulation of dirt and shading changes are related to the rotating time of the polygon mirror, the rotating time may be stored and the correction data altered in accordance with the rotating time. For example, the correction may be performed using the correction pattern 1 of FIG. 5 and, once the rotating time of the polygon mirror has exceeded 100 hours, it may be shifted to correction pattern 2. Thereafter, by implementing a control in which the correction pattern is switched to 3, 4, 5 . . . and so on in this way, the correction pattern is able to be switched without need for the user or serviceman of the device to implement a special operation.

Figure 13:
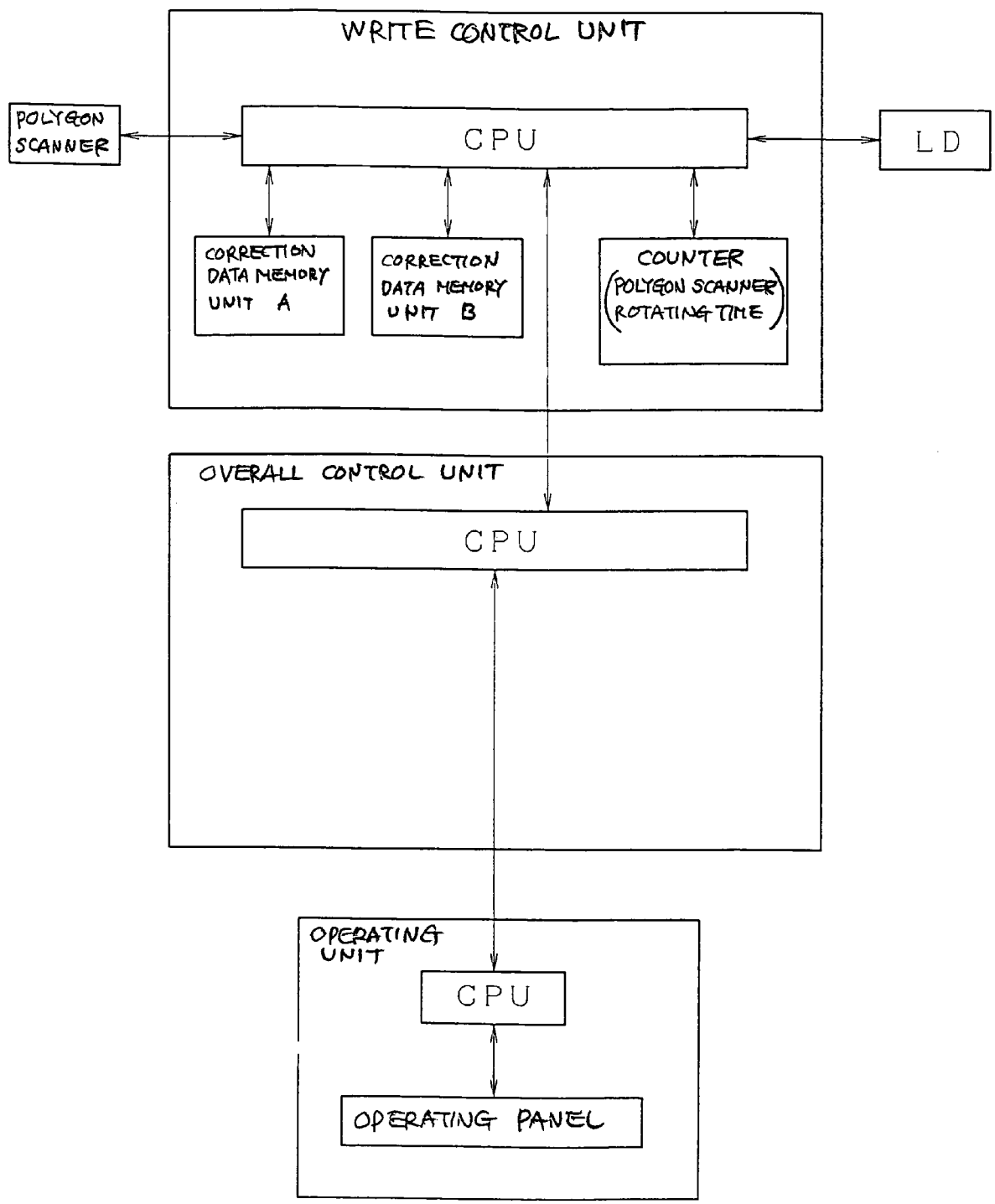
FIG. 13 is a block diagram showing the configuration of a system for executing a prescribed routine following a fixed rotating time of an optical deflector.
Figure 14:
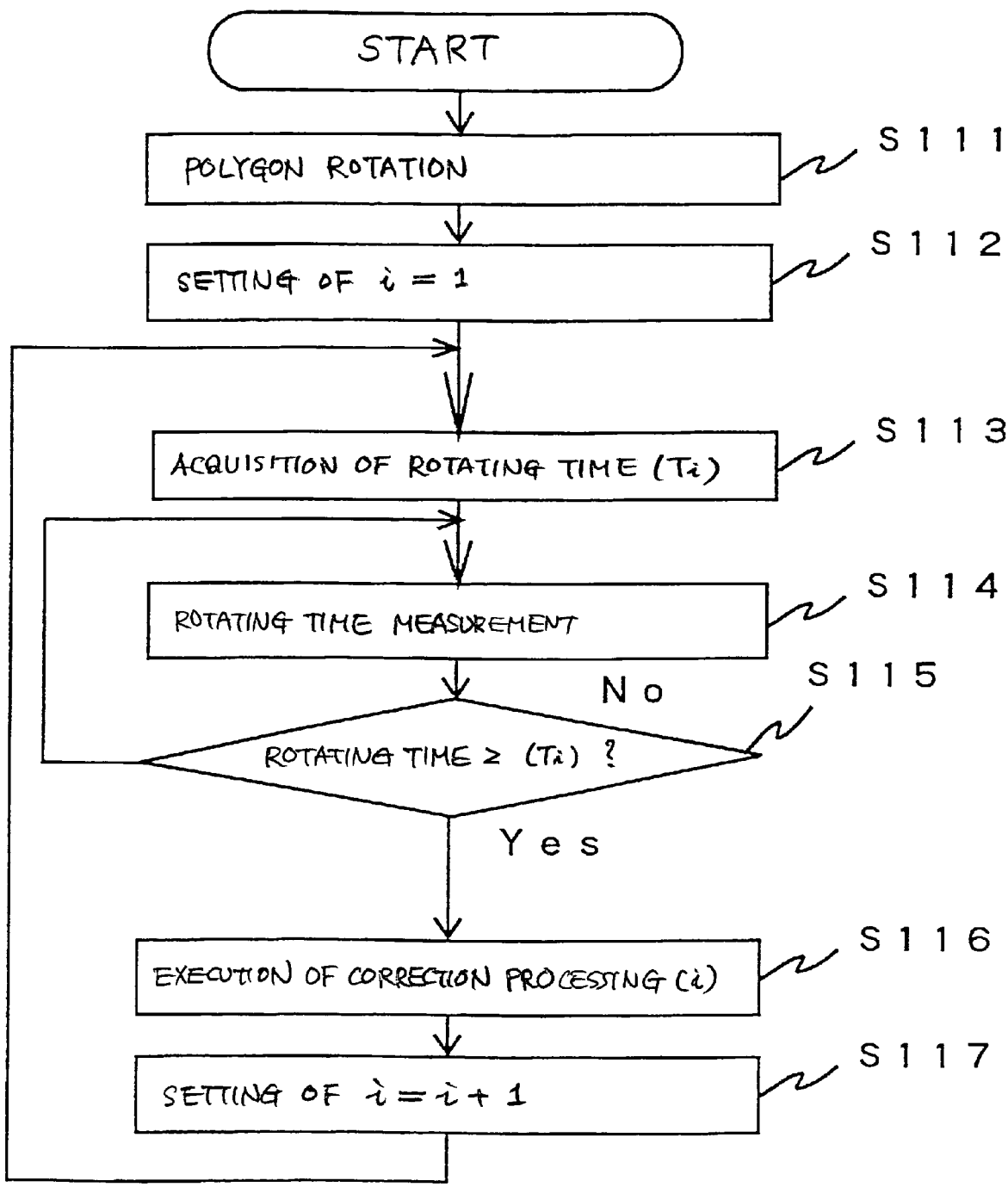
FIG. 14 is a flow chart of a correction data selection program for executing a prescribed routine following a fixed rotating time of an optical deflector.

FIG. 13 is a block diagram showing the configuration of a system for executing a prescribed routine following a fixed rotating time of the optical deflector. In addition, FIG. 14 is a flow chart of a correction data selection program for executing a prescribed routine following a fixed rotating time of the optical deflector.

Instead of the rotating time of the polygon scanner, the number of sheets of paper on which images are to be formed may be counted and the correction pattern changed at fixed number intervals.

Figure 15:
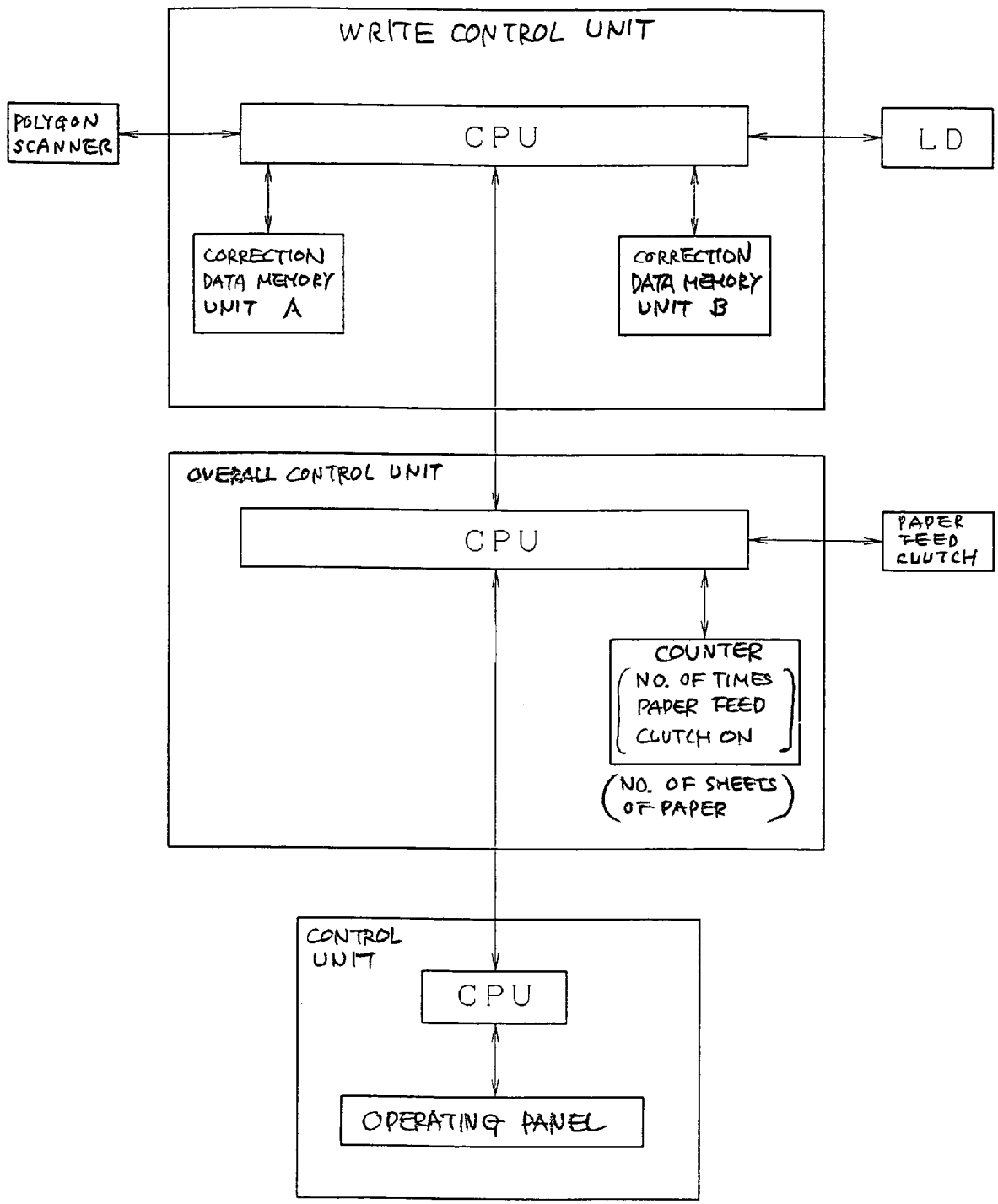
FIG. 15 is a block diagram showing the configuration of a system for the executing of a prescribed routine following counting of a fixed number of sheets of paper.
Figure 16:
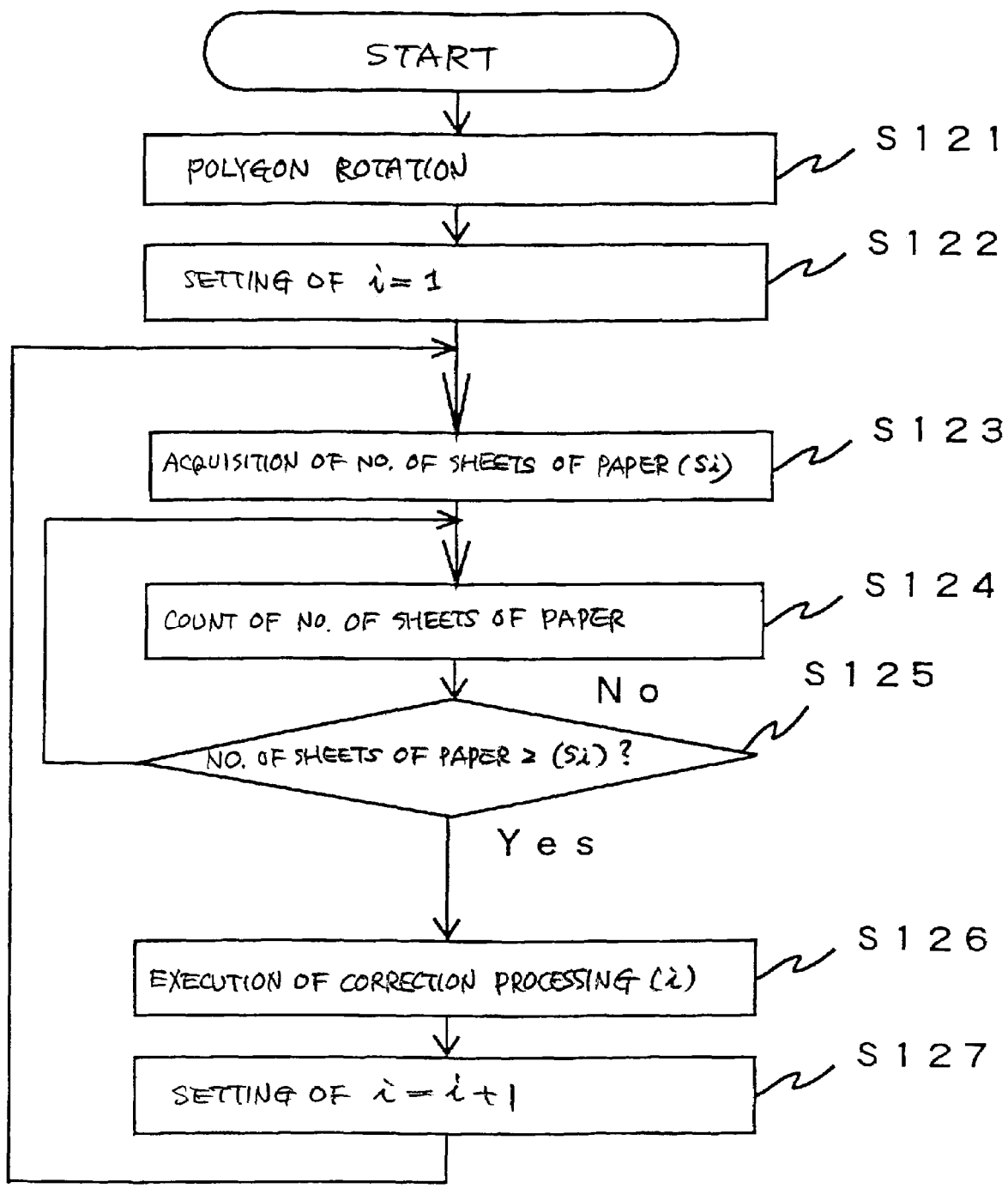
FIG. 16 is a flow chart of a correction data selection program for executing a prescribed routine following counting of a fixed number of sheets of paper.

FIG. 15 is a block diagram showing the configuration of a system for the executing of a prescribed routine following the counting of a fixed number of sheets of paper. In addition, FIG. 16 is a flow chart of a correction data selection program for executing a prescribed routine following the counting of a fixed number of sheets of paper.

Figure 17:
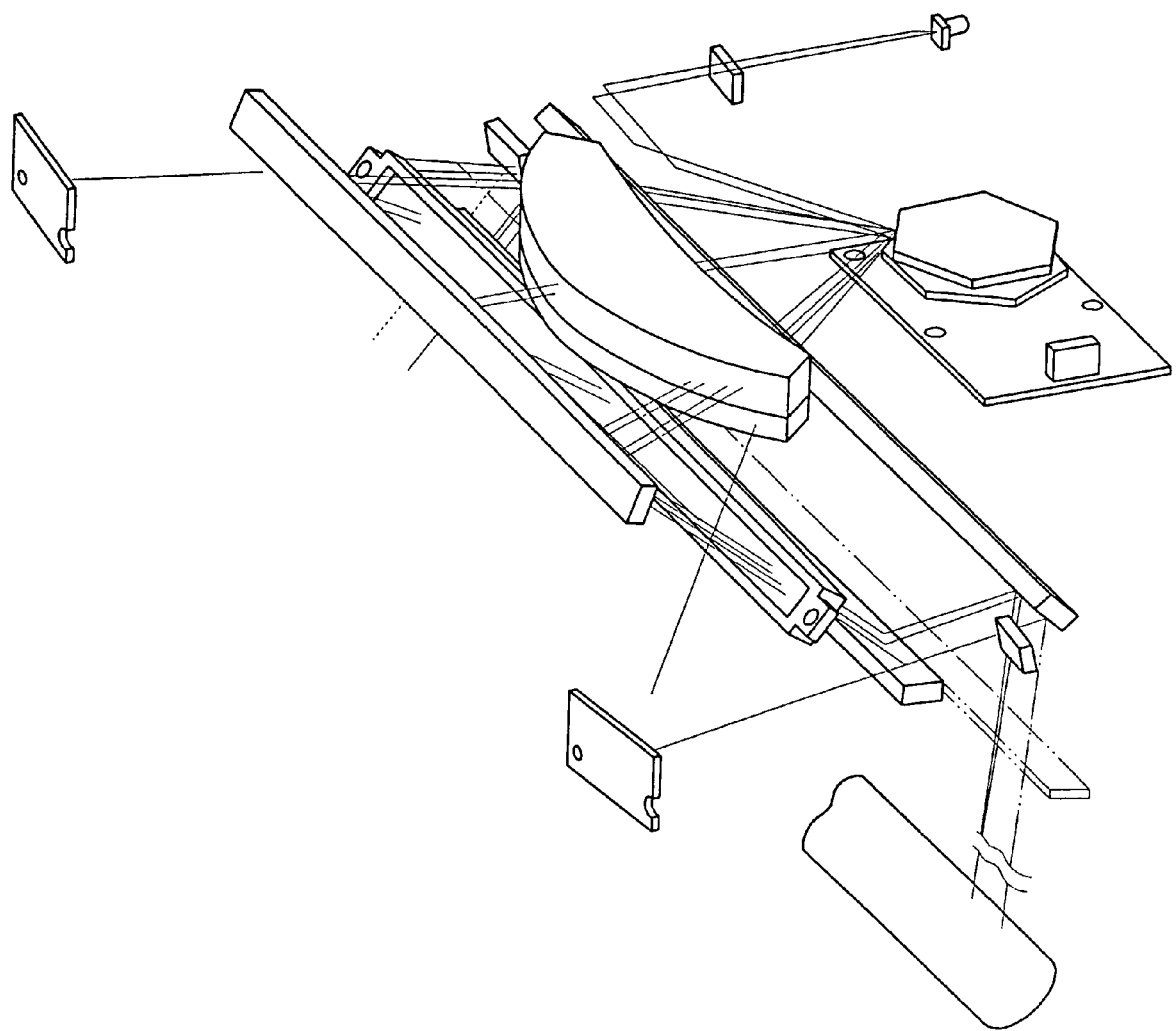
FIG. 17 is a diagram showing an example of a structure in which synchronous sensors are provided at the front and rear ends of a scan.

On the other hand, the image forming apparatus of the above second embodiment uses photosensors arranged in a plurality of positions in the main scan direction in order to align the images of each color. For example, sensors are used at both ends as shown in FIG. 17 and, by a comparison of the output voltages taken when the output images are read as being of the same density, a general estimate of the changed state can be attained. When the output difference is fixed, the correction pattern can be switched in a manner compliant with the actual changes in the image using the correction pattern shifting of FIG. 5. Although, in this example, the density of the image formed on a so-called transfer belt is measured, the density of the image on the photosensitive drum or of the image transferred onto the paper may be measured. Each of these measurement means have wide application and so a detailed description thereof has been omitted.

Figure 18:
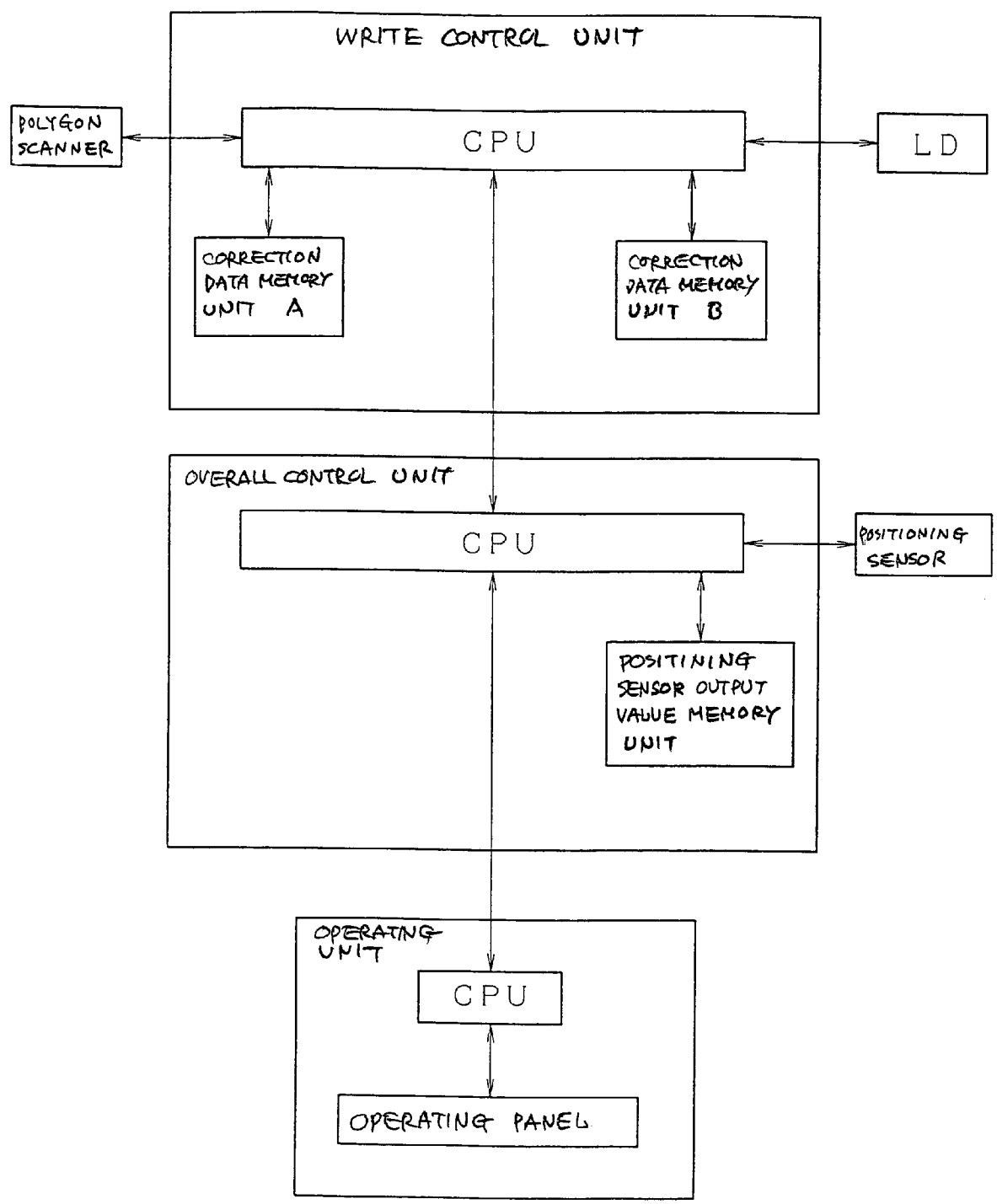
FIG. 18 is a block diagram showing the configuration of a system for executing a prescribed routine when image density difference exceeds a fixed value.
Figure 19:
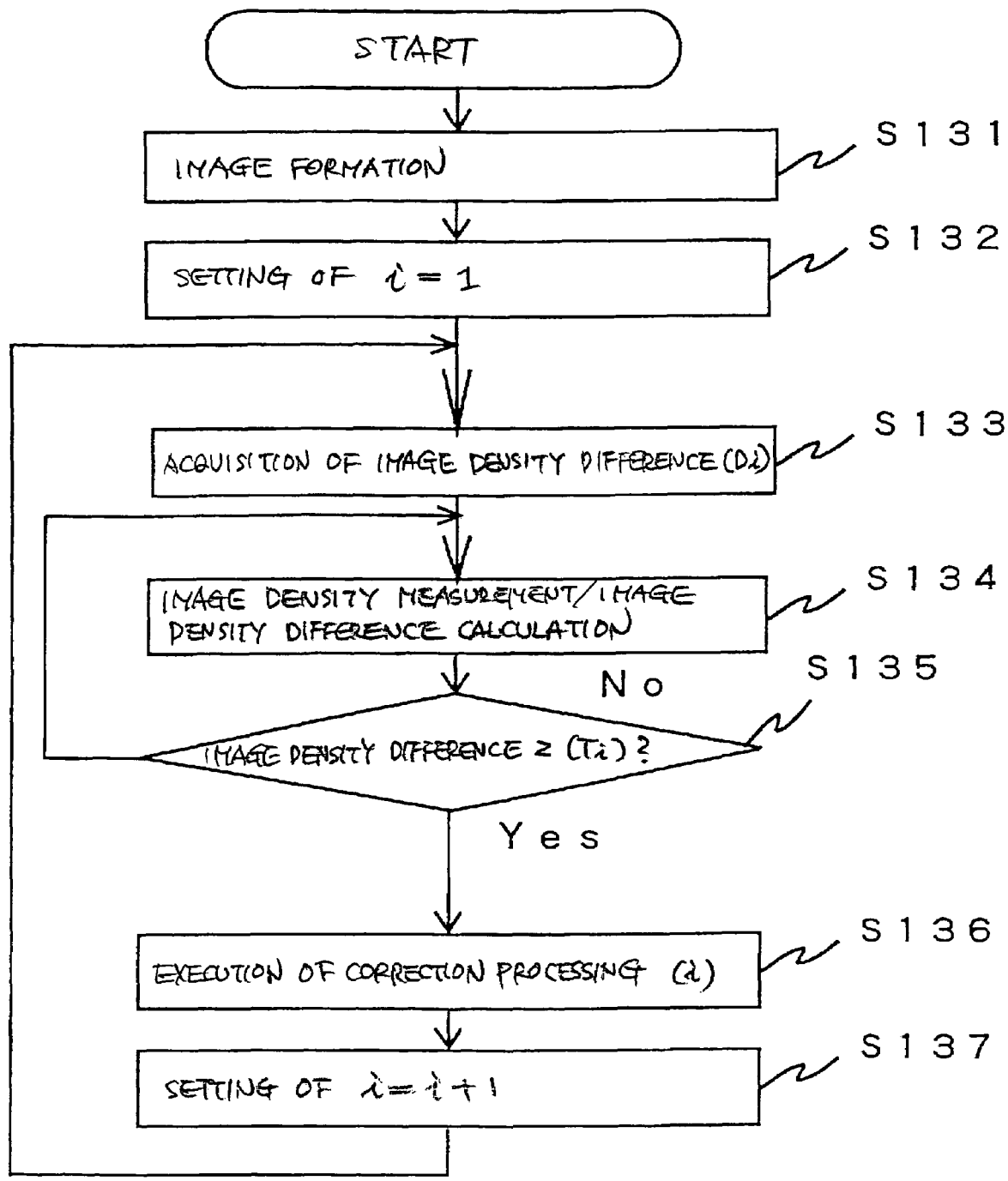
FIG. 19 is a flow chart of a correction data selection program for executing a prescribed routine when image density difference exceeds a fixed value.

FIG. 18 is a block diagram showing the configuration of a system for executing a prescribed routine when image density difference exceeds a fixed value. In addition FIG. 19 is a flow chart of a correction data selection program for executing a prescribed routine when image density difference exceeds a fixed value.

In addition, instead of image density being measured, the switching of the correction pattern may be based on difference in the light quantity itself.

Figure 20:
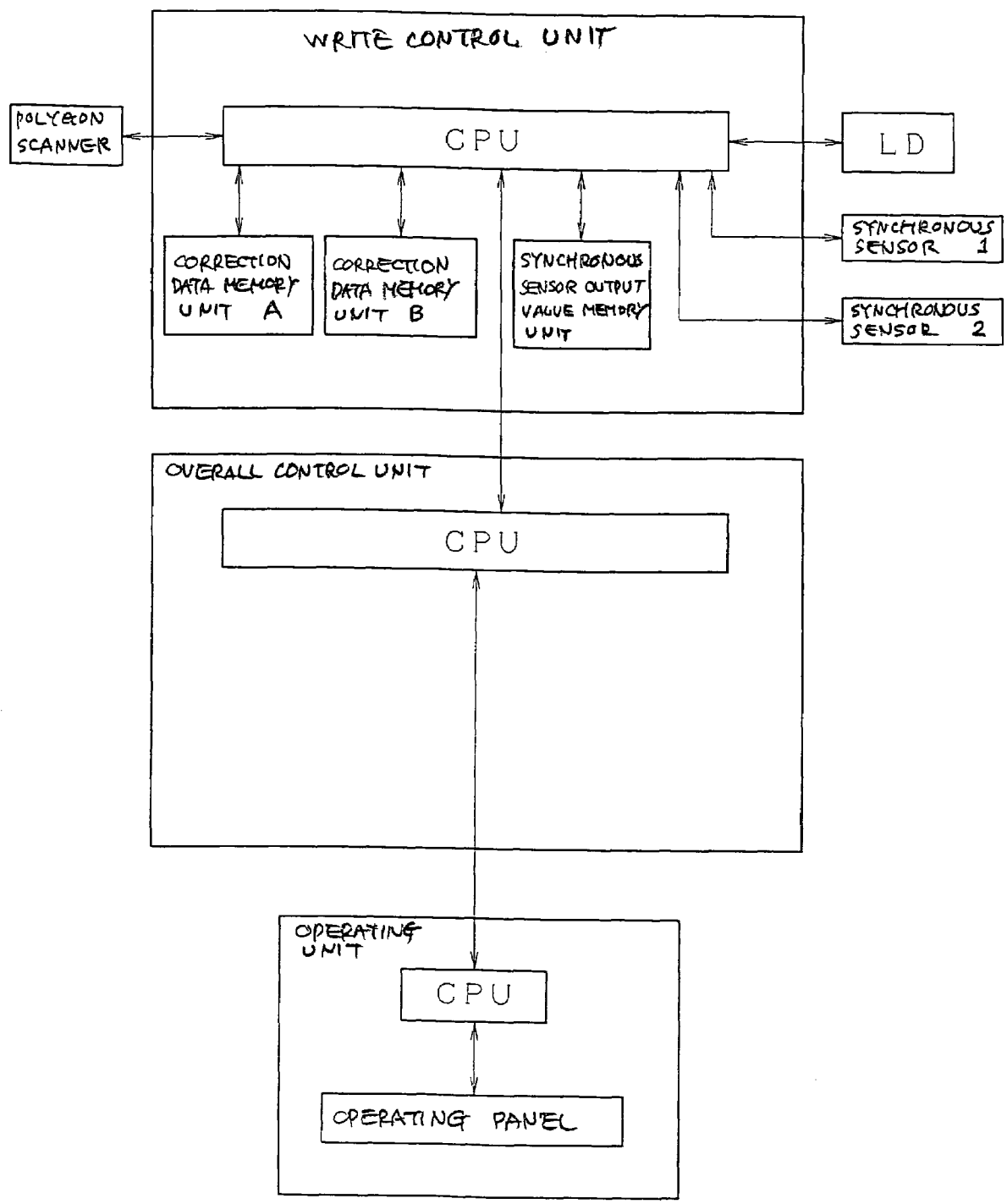
FIG. 20 is a block diagram showing the configuration of a system for executing a prescribed routine when difference in the light quantity itself exceeds a fixed value.
Figure 21:
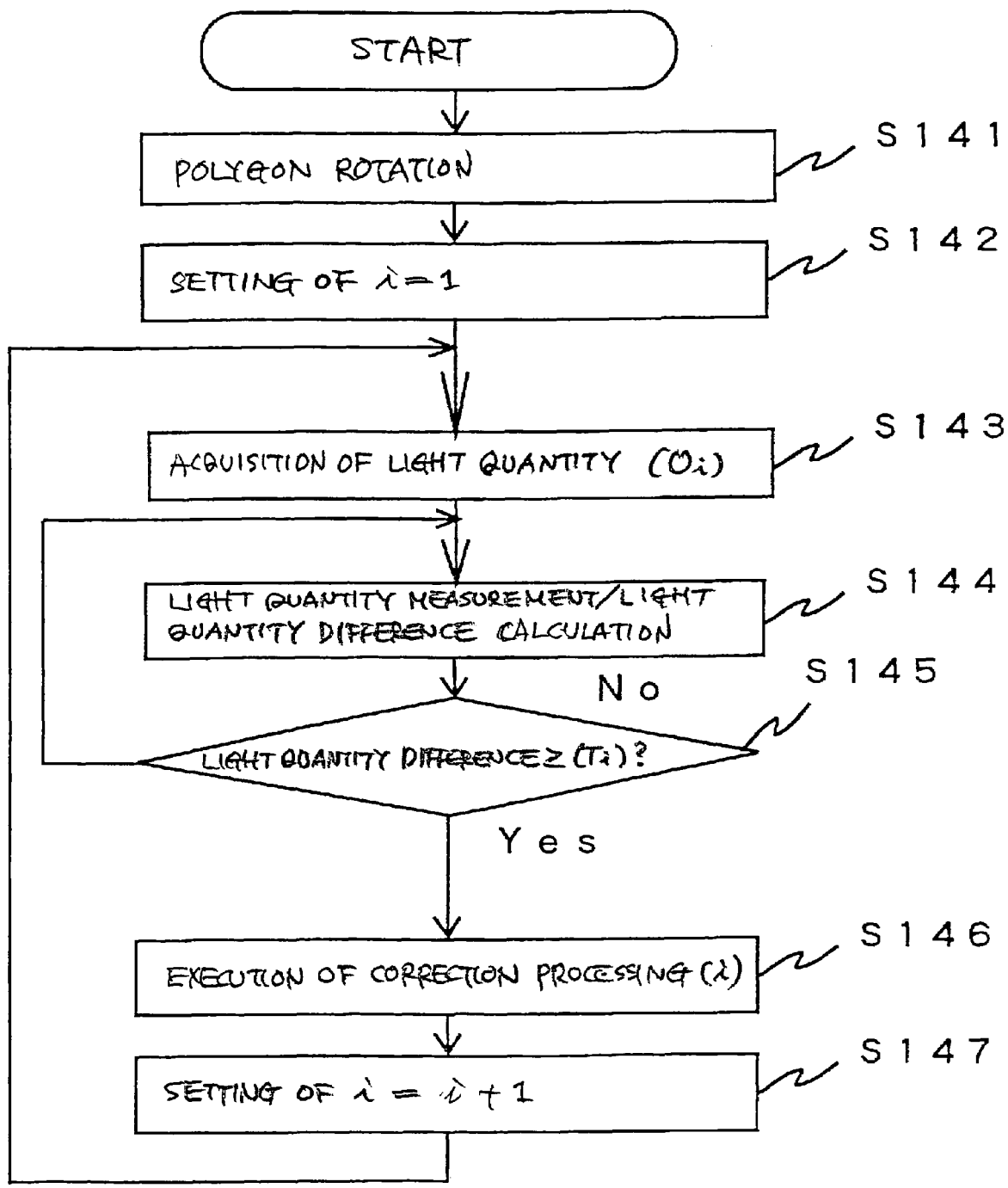
FIG. 21 is a flow chart of a correction data selection program for executing a prescribed routine when difference in the light quantity itself exceeds a fixed value.

FIG. 20 is a block diagram showing the configuration of a system for executing a prescribed routine when difference in the light quantity itself exceeds a fixed value. In addition FIG. 21 is a flow chart of a correction data selection program for executing a prescribed routine when difference in the light quantity itself exceeds a fixed value.

While switching of the correction pattern is performed by the automatic switching control of the correction pattern described above without need for implementation of a special operation by the user or serviceman of the device, the switching of the correction pattern may involve the prescribed output of a confirmation message or the like on a display part such as a touch panel or the like, the performing of the correction being based on instructions input via an operating panel by the user or serviceman of the device.

Figure 22:
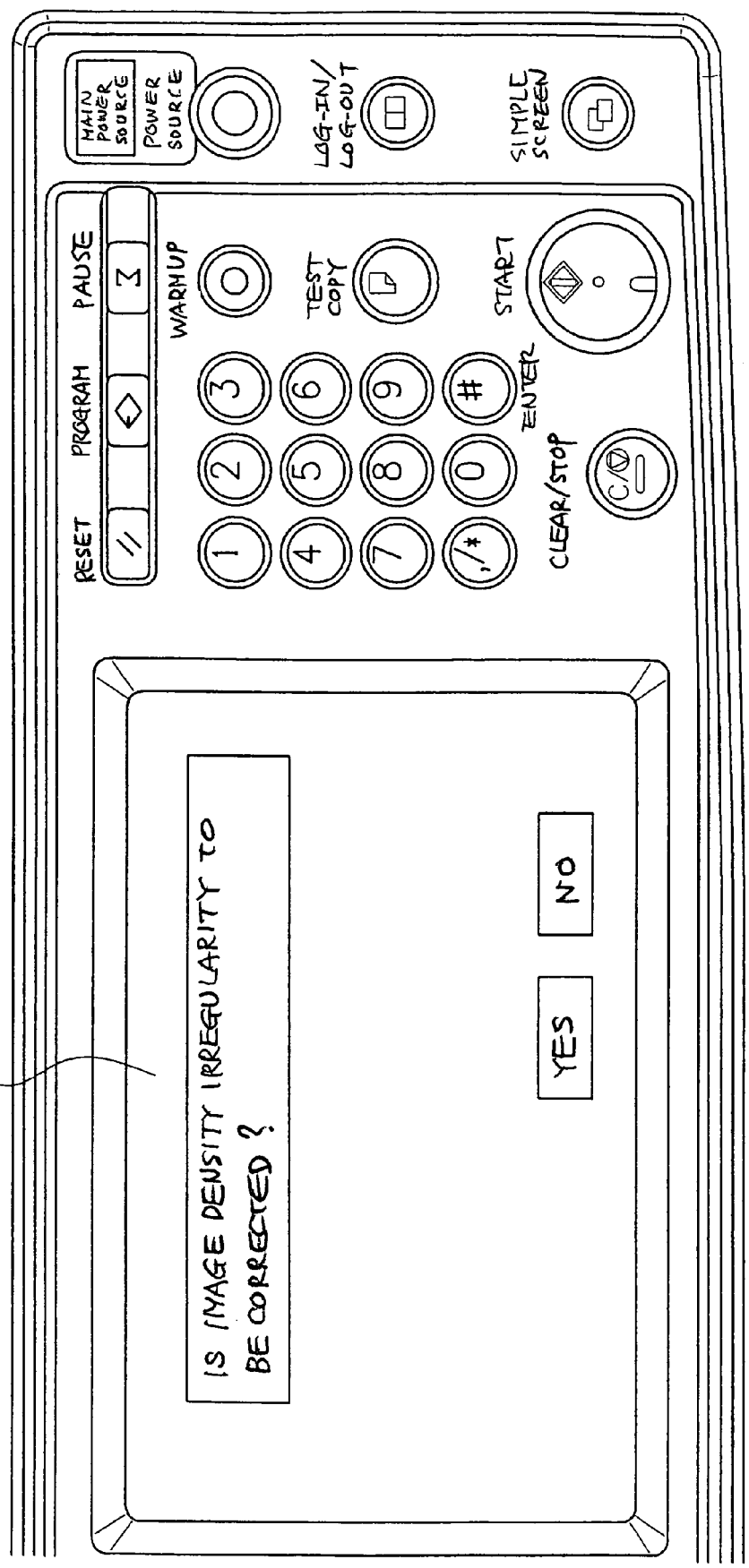
FIGS. 22 and 23 are diagrams showing examples of image displays used for confirming switching of a correction pattern.

FIG. 22 constitutes an example display in the use of operating unit comprising a touch panel 201 with both display and operation function employed in the image forming apparatus. One of either image density difference or light quantity difference is measured and, when this exceeds a fixed value, the message "IS IMAGE DENSITY IRREGULARITY TO BE CORRECTED?" is displayed on the touch panel. Simultaneously, the touch keys "YES" and "NO" are displayed, and by pushing either one the user or the serviceman of the device judges whether or not the correction has been performed.

Figure 23:
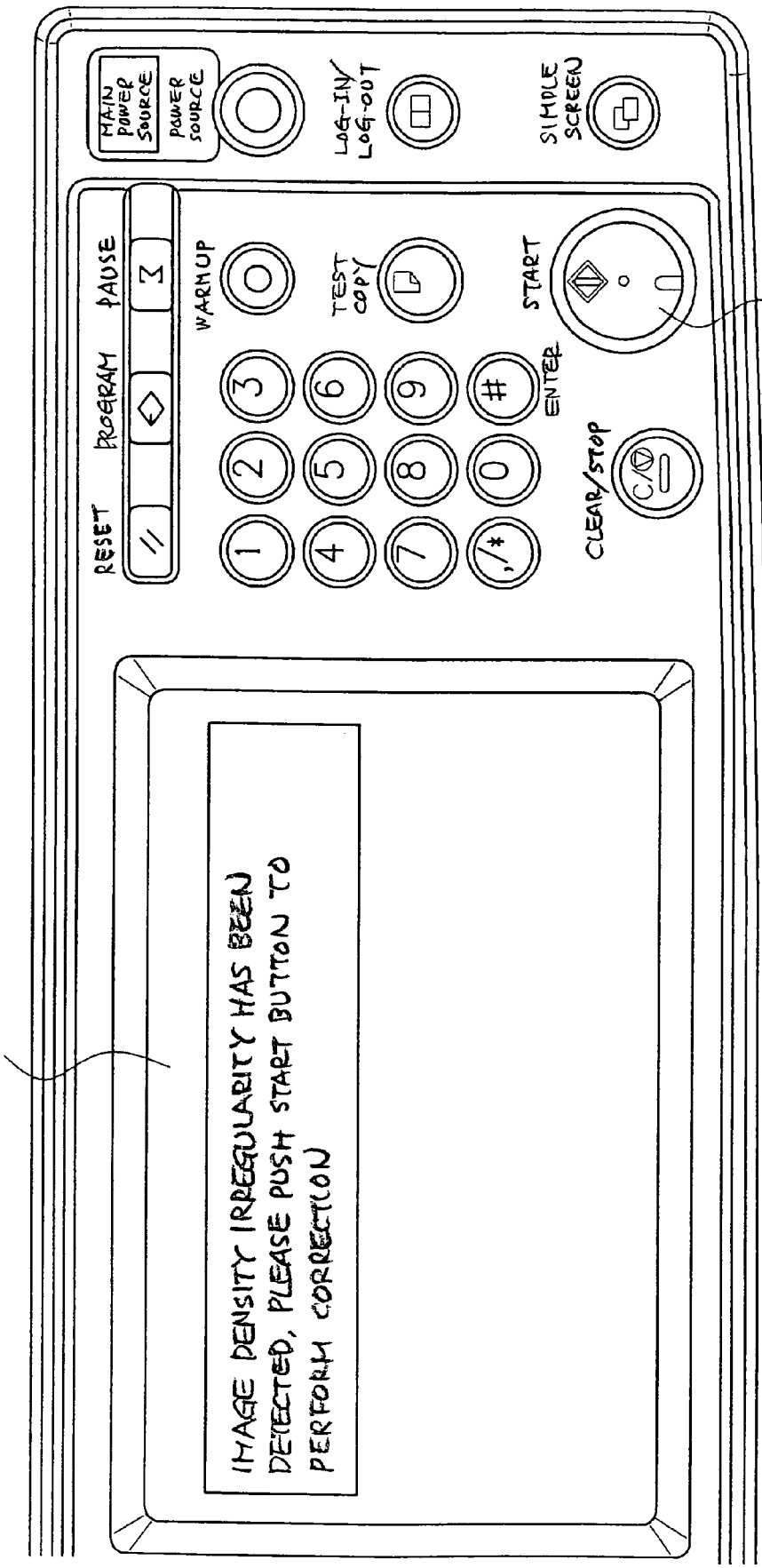

FIG. 23 constitutes an example display when an operating unit comprising a liquid crystal panel 211 comprising only a display function is used. One of either image density difference or the light quantity difference is measured and, when this exceeds a fixed value, a message "IMAGE DENSITY IRREGULARITY HAS BEEN DETECTED, PLEASE PUSH START BUTTON TO PERFORM CORRECTION" is displayed on the liquid crystal panel. Correction is performed only when the start button 212 is pushed.

In the replacement of a polygon scanner or optical writer in which switching of correction pattern is automatically performed as described above, the correction pattern is able to be appropriately reshifted by restoration to the initial state of the correction pattern. While a special key may be provided in the operating unit for forming the initial correction pattern, this procedure is generally thought of as being performed by a serviceman and, as such, a special command input or communication means may be employed.

According to the present invention, even if dirt attaches to the polygon mirror surface over time and the shading characteristics deteriorate resulting in the generation of image defects such as image density irregularity, because the optimum shading correction data can be easily selected by the user or servicemen, shading correction can be efficiently performed.

Various modifications will become possible for those skilled in the art after receiving the teachings of the present disclosure without departing form the scope thereof.

What is claimed is:

1. An image forming apparatus, comprising:
   a light source unit configured to emit a light beam;
   an optical deflector configured to generate a scanning light beam from said light beam of the light source unit;
   an optical writer comprising an optical system configured to guide the scanning light beam from said optical deflector onto a surface to be scanned of an image carrier and form an image thereon; and
   a memory unit configured to store a plurality of shading correction data and a plurality of rotating times of the optical deflector, each of the plurality of shading correction data associated to one of the plurality of rotating times, the plurality of shading correction data configured to correct a light shading caused by a light loss between the light beam and the scanning light beam due to accumulation of dirt on the optical deflector in accordance with a respective rotating time of the optical deflector.

2. The image forming apparatus as claimed in claim 1, further comprising:
   a selector configured to enable desired correction data to be selected from said plurality of shading correction data stored before an operation of the image forming apparatus.

3. The image forming apparatus as claimed in claim 2, wherein said selector includes an operating unit provided for image forming operation instructions.

4. The image forming apparatus as claimed in claim 2, wherein said selector includes a correction data selection program configured to execute a prescribed routine.

5. The image forming apparatus as claimed in claim 4, further comprising:
   a measurement unit configured to measure the rotating time of the optical deflector, wherein said correction data selection program is configured to execute said prescribed routine following a fixed rotating time of the optical deflector.

6. The image forming apparatus as claimed in claim 4, further comprising:
   a counter to count a number of sheets of paper on which images have been formed, wherein said correction data selection program is configured to execute said prescribed routine following the counting of a fixed number of sheets of paper.

7. The image forming apparatus as claimed in claim 4, further comprising:
   a measurement unit configured to measure in a main scan direction, a density of images formed on the surface to be scanned or of images transferred from the surface to be scanned; and
   a calculation unit for calculating the measured image density, wherein said correction data selection program is configured to execute said prescribed routine when an image density difference exceeds a fixed value.

8. The image forming apparatus as claimed in claim 7, wherein said measurement unit is further configured to measure an image density in any section of the image forming apparatus, and said correction data selection program configured to execute said prescribed routine when an image density difference exceeds a fixed value.

9. The image forming apparatus as claimed in claim 4, further comprising:
   a measurement unit configured to measure, in a main scan direction in a plurality of locations, a density of images formed on the surface to be scanned or of images transferred from the surface to be scanned; and
   a calculator to calculate the measured image density difference in the plurality of locations,
   wherein said correction data selection program is configured to execute said prescribed routine when the image density difference exceeds a fixed value.

10. The image forming apparatus as claimed in claim 9, wherein said measurement unit is further configured to measure an image density in any section of the image forming apparatus, and said correction data selection program is configured to execute said prescribed routine when an image density difference exceeds a fixed value.

11. The image forming apparatus as claimed in claim 4, further comprising:
    a measurement unit configured to measure a difference in light quantity itself, and configured to calculate the measured difference in light quantity itself,
    wherein said correction data selection program is configured to execute said prescribed routine when the difference in the light quantity itself exceeds a fixed value.

12. The image forming apparatus as claimed in claim 4, further comprising:
    a unit configured to restore correction data to an initial state.

13. The image forming apparatus as claimed in claim 2, wherein said selector further includes a correction data selection program configured to execute a prescribed routine and an operating unit provided for image forming operation instructions in accordance with the notification of the processing results of said correction data selection program.

14. The image forming apparatus as claimed in claim 1, further comprising:
    a plurality of optical systems, each configured to guide a scanning light beam from said optical deflector onto a surface to be scanned of an image carrier and form an image thereon, wherein said memory unit is further configured to store a correction data group for each of the optical systems, each correction data group comprising a plurality of shading correction data that is configured to correct a light shading caused by a light loss between the light beam and the scanning light beam of each optical system due to accumulation of dirt on the optical deflector.

15. The image forming apparatus as claimed in claim 14, further comprising:
    a selector configured to generate each of the correction data groups corresponding individually to each of the plurality of optical systems which enables an appropriate correction data to be selected from the plurality of shading correction data stored in one of the correction data groups.

16. The image forming apparatus according to claim 1, further comprising:
    a selector configured to select correction data from said plurality of shading correction data stored in the memory unit, the selection based on an effective rotating time of the optical deflector.

17. An image forming apparatus, comprising:
    a light source unit configured to emit a light beam;

an optical deflector configured to generate a scanning light beam from said light beam of the light source unit;

an optical writer comprising an optical system configured to guide the scanning light beam from said optical deflector onto a surface to be scanned of an image carrier and form an image thereon;

a memory unit configured to store a plurality of shading correction data that is configured to correct a light shading caused by a light loss between the light beam and the scanning light beam due to accumulation of dirt on the optical deflector;

a second light source unit configured to emit a second light beam;

a second optical deflector configured to direct the second light beam from said second light source unit to form a second scanning light beam, the second scanning light beam being in a substantially symmetric direction relative to the scanning light beam; and a second optical writer comprising a second optical system, wherein the optical system and the second optical system are arranged in two directions that are substantially symmetric about a rotational axis of said optical deflector and the second optical deflector for guiding the scanning light beam and the second scanning light beam onto respectively correspondent surfaces to be scanned and forming images thereon, wherein said memory unit is further configured to store a plurality of data groups comprising a plurality of shading correction data that is configured to correct a light shading caused by a light loss between the light beam and the scanning light beam due to accumulation of dirt on the optical deflector and the second optical deflector, respectively.

18. The image forming apparatus as claimed in claim 17, wherein correction data of different types is selected from said plurality of shading correction data for each of the two directions in which said light beams are directed.

19. An image forming apparatus comprising:

a light emitting means emitting a light beam;

an optical deflecting means generating a scanning light beam from said light beam of the light emitting means;

an optical writing means including an optical guiding means for guiding the scanning light beam from said optical deflecting means onto a surface to be scanned of an image carrier and forming an image thereon; and a memory means for storing a plurality of shading correction data for correcting a light shading caused by a light loss between the light beam and the scanning light beam due to accumulation of dirt on the optical deflecting means;

a second light emitting means emitting a second light beam;

a second optical deflecting means directing the second light beam from said second light emitting means to form a second scanning light beam, the second scanning light beam being in a substantially symmetric direction relative to the scanning light beam; and a second optical writing means including a second optical guiding means, wherein the optical guiding means and the second optical guiding means are arranged in two directions that are substantially symmetric about a rotational axis of said optical deflecting means and the second optical deflecting means for guiding the scanning light beam and the second scanning light beam onto respectively correspondent surfaces to be scanned and forming images thereon, wherein said memory means further stores a plurality of data groups comprising a plurality of shading correction data that are configured to correct a light shading caused by a light loss between the light beam and the scanning light beam due to accumulation of dirt on the optical deflecting means and the second optical deflecting means, respectively.

20. The image forming apparatus as claimed in claim 19, wherein correction data of different types is selected from said plurality of shading correction data for each of the two directions in which said light beams are directed.

* * * * *